US012726811B2

(12) United States Patent
Sha et al.

(10) Patent No.: US 12,726,811 B2
(45) Date of Patent: Sep. 1, 2026

(54) COMMUNICATION METHOD AND COMMUNICATION APPARATUS

(71) Applicant: HUAWEI TECHNOLOGIES CO., LTD., Shenzhen (CN)

(72) Inventors: Tong Sha, Beijing (CN); Junren Chang, Beijing (CN); Shulan Feng, Beijing (CN); Peng Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 328 days.

(21) Appl. No.: 18/463,004

(22) Filed: Sep. 7, 2023

(65) Prior Publication Data

US 2023/0422021 A1 Dec. 28, 2023

Related U.S. Application Data

(63) Continuation of application No. PCT/CN2022/078792, filed on Mar. 2, 2022.

(30) Foreign Application Priority Data

Mar. 9, 2021 (CN) ......................... 202110256446.0

(51) Int. Cl.

| | |
|---|---|
| ***H04L 67/303*** | (2022.01) |
| ***H04L 1/1812*** | (2023.01) |
| ***H04W 8/22*** | (2009.01) |
| ***H04W 76/14*** | (2018.01) |

(52) U.S. Cl.

CPC ............. *H04W 8/22* (2013.01); *H04L 1/1812* (2013.01)

(58) Field of Classification Search

CPC ....... H04W 8/22; H04W 76/14; H04W 12/03; H04W 12/106; H04W 8/24; H04W 76/27; H04L 1/1812; H04L 67/303

See application file for complete search history.

(56) References Cited

U.S. PATENT DOCUMENTS

| | | | | |
|---|---|---|---|---|
| 2018/0199185 A1* | 7/2018 | Tenny | ..................... | H04W 8/22 |
| 2019/0230499 A1 | 7/2019 | Sun et al. | | |

FOREIGN PATENT DOCUMENTS

| | | |
|---|---|---|
| CN | 112351418 A | 2/2021 |

OTHER PUBLICATIONS

International Search Report issued in corresponding International Application No. PCT/CN2022/078792, dated May 24, 2022, pp. 1-10.

Ericsson:"Correction to UE capability procedures in 38.331",3GPP TSG-RAN2 Meeting #104, Spokane, USA, Nov. 12, 2018 to Nov. 16, 2018, R2-1819194, total 37 pages.

(Continued)

*Primary Examiner* — Joseph E Dean, Jr.

(74) *Attorney, Agent, or Firm* — HAUPTMAN HAM, LLP

(57) ABSTRACT

A communication method includes sending, by a first device, first information to a second device. The first information includes N capability parameter sets different from a first capability. The N capability parameter sets are supported by the first device at a time when the first device requests capability adjustment from the second device. The first capability is a maximum capability supported by the first device, and N is an integer greater than or equal to 1.

20 Claims, 9 Drawing Sheets

(56) References Cited

OTHER PUBLICATIONS

Huawei, HiSilicon:"Discussion on simultaneous RxTx capability (LS contact)",3GPP TSG-RAN WG2 Meeting #113 electronic, Online, Jan. 25-Feb. 5, 2021, R2-2101662, total 13 pages.
ZTE Corporation, Sanechips:"Further consideration on the Notes to the FeatureSetCombination",3GPP TSG-RAN WG2 Meeting #110-e, Electronic, Jun. 1-Jun. 11, 2020, R2-2004972, total 5 pages.
Extended European Search Report issued in corresponding European Application No. 22766203.8, dated Jul. 30, 2024, pp. 1-14.

* cited by examiner

COMMUNICATION METHOD AND COMMUNICATION APPARATUS

CROSS-REFERENCE TO RELATED APPLICATIONS

This application is a continuation of International Application No. PCT/CN2022/078792, filed on Mar. 2, 2022, which claims priority to Chinese Patent Application No. 202110256446.0, filed on Mar. 9, 2021. The disclosures of the aforementioned applications are hereby incorporated by reference in their entireties.

TECHNICAL FIELD

This application relates to the communication field, and more specifically, to a communication method and a communication apparatus.

BACKGROUND

In a wireless communication system, a network device needs to learn of capability information of user equipment (UE), for example, a radio access-related capability of the UE or a core network-related capability of the UE. Because each UE has a different capability, after establishing a connection, the UE reports the capability information to the network device, for example, a maximum carrier aggregation bandwidth supported by the UE, a number of multiple-input multiple-output (MIMO) layers, and a modulation order. Then, the network device performs radio resource control (RRC) reconfiguration based on the capability information reported by the UE, and performs scheduling and communication according to an appropriate algorithm.

When the UE needs to update capabilities in different scenarios, the UE performs a "mobility registration update" procedure to update the capabilities. However, in this process, the UE needs to re-register with a network, which results in interruption of a current service of the UE, and greatly affects user experience. Therefore, how to enable the UE to update a capability more dynamically and flexibly is a problem that needs to be resolved currently.

SUMMARY

This application provides a communication method and a communication apparatus, so that a first device reports a plurality of capability parameters, to support flexible switching between a plurality of capabilities.

According to a first aspect, a communication method is provided. The method may be performed by a terminal device, or may be performed by a chip or a circuit disposed in a terminal device. This is not limited in this application. The method includes: A first device sends first information to a second device, where the first information includes N capability parameter sets different from a first capability, the capability parameter set is a capability parameter set supported by the first device when the first device request capability adjustment from the second device, the first capability is a maximum capability supported by the first device, and N is an integer greater than or equal to 1.

Based on the foregoing solution, the first device sends the N capability parameter sets to the second device, so that a capability of the first device can be dynamically updated when the first device has a capability adjustment requirement.

With reference to the first aspect, in some implementations of the first aspect, the N capability parameter sets include at least one of the following parameters: N band combination lists, where the band combination list includes at least one band combination; N feature set combinations, where the N feature set combinations are associated with one band combination by using corresponding feature set combination identifiers; N feature sets, where the N feature sets correspond to one band in a band combination; and N feature sets per component carrier, where the N feature sets per component carrier correspond to one component carrier on one band in the band combination.

Based on the foregoing solution, N capability parameters are reported at different capability levels, so that when the first device has the capability adjustment requirement, the first device may flexibly switch in the N capability parameter sets reported in the foregoing manner.

With reference to the first aspect, in some implementations of the first aspect, the N capability parameter sets further include at least one of the following parameters: at least one packet data convergence protocol PDCP sequence number length, at least one radio link control RLC sequence number length, and at least one number of hybrid automatic repeat request HARQ processes.

With reference to the first aspect, in some implementations of the first aspect, the first information is user equipment UE capability information.

In this solution, both the N capability parameter sets and the maximum capability of the first device are reported. In this case, when the capability parameter sets include a fallback capability parameter supported by the first capability, it may implicitly indicate that the first device supports the fallback capability parameter of the first capability.

Alternatively, when both the N capability parameter sets and the maximum capability of the first device are reported, the first device sends second information to the second device. The second information explicitly indicates that the first device supports a fallback capability of the first capability.

With reference to the first aspect, in some implementations of the first aspect, the first device does not report the N capability parameter sets when reporting the maximum capability. In this solution, the first device determines that a capability of the first device changes or a capability of the first device needs to change, and sends the first information.

With reference to the first aspect, in some implementations of the first aspect, the first device reports both the N capability parameter sets and the maximum capability of the first device in the UE capability information; and then the first device determines that a capability of the first device changes or a capability of the first device needs to change, and sends third information to the second device. The third information indicates a capability parameter set identifier or capability parameter identifier to which the first device is adjusted or needs to be adjusted. The capability parameter set identifier is an identifier of one of the N capability parameter sets different from the first capability. The capability parameter identifier is an identifier of a capability parameter in the N capability parameter sets different from the first capability.

Based on the foregoing solution, the first device reports the N capability parameter sets to the second device before the capability changes or the capability needs to change, so that the second device can predict a capability to which the first device may be adjusted. Compared with a solution in which the first device reports the capability parameter set after the capability changes or the capability needs to change, the foregoing solution can reduce scheduling complexity of the second device. Further, the third information indicates the capability parameter set identifier or the capability parameter identifier, so that signaling overheads for reporting the capability parameter set or the capability parameter are reduced.

Optionally, when the third information indicates the capability parameter identifier to which the first device is adjusted or needs to be adjusted, the third information includes at least one of the following: a band combination list identifier, a band combination, a feature set combination identifier corresponding to the band combination, a per band feature set identifier corresponding to a band in the band combination, and a per component carrier feature set identifier corresponding to a component carrier on the band in the band combination.

With reference to the first aspect, in some implementations of the first aspect, the method further includes: The first device sends fourth information to the second device. The fourth information indicates a cause or an objective of capability adjustment of the first device.

Optionally, the method further includes: The first device receives response information from the second device, or the first device receives no response information within first duration after sending the third information. The response information indicates that the second device allows the capability of the first device to be adjusted to a capability parameter set corresponding to the capability parameter set identifier or adjusted to a capability parameter corresponding to the capability parameter identifier. The first device communicates with the second device based on the adjusted capability parameter set or the adjusted capability parameter.

According to a second aspect, a communication method is provided. The method may be performed by a terminal device or a network device, or may be performed by a chip or a circuit disposed in a terminal device or a network device. This is not limited in this application. The method includes: A second device receives first information from a first device. The first information includes N capability parameter sets different from a first capability. The capability parameter set is a capability parameter set supported by the first device when the first device request capability adjustment from the second device. The first capability is a maximum capability supported by the first device. N is an integer greater than or equal to 1.

Based on the foregoing solution, the second device receives the N capability parameter sets, so that a capability of the first device can be dynamically updated when the first device has a capability adjustment requirement.

With reference to the second aspect, in some implementations of the second aspect, the N capability parameter sets include at least one of the following parameters: N band combination lists, where the band combination list includes at least one band combination; N feature set combinations, where the N feature set combinations are associated with one band combination by using corresponding feature set combination identifiers; N feature sets, where the N feature sets correspond to one band in a band combination; and N feature sets per component carrier, where the N feature sets per component carrier correspond to one component carrier on one band in the band combination.

With reference to the second aspect, in some implementations of the second aspect, the capability parameter sets further include at least one of the following parameters: at least one PDCP sequence number length, at least one RLC sequence number length, and at least one number of HARQ processes.

With reference to the second aspect, in some implementations of the second aspect, the first information is UE capability information.

With reference to the second aspect, in some implementations of the second aspect, regardless of whether the capability parameter sets include or do not include a fallback capability parameter supported by the first capability, the first device supports the fallback capability parameter of the first capability, and the second device should consider that the first device supports a fallback capability of the first capability.

With reference to the second aspect, in some implementations of the second aspect, the second device receives second information from the first device. The second information indicates that the first device supports a fallback capability of the first capability.

With reference to the second aspect, in some implementations of the second aspect, after receiving the first information, the second device changes a configuration of the first device based on the N capability parameter sets different from the first capability.

With reference to the second aspect, in some implementations of the second aspect, the second device receives third information from the first device. The third information indicates a capability parameter set identifier or capability parameter identifier to which the first device is adjusted or needs to be adjusted. The capability parameter set identifier is an identifier of one of the N capability parameter sets different from the first capability. The capability parameter identifier is an identifier of a capability parameter in the N capability parameter sets different from the first capability. The second device changes a configuration of the first device based on the third information.

With reference to the second aspect, in some implementations of the second aspect, the second device receives fourth information from the first device. The fourth information indicates a cause or an objective of capability adjustment of the first device.

With reference to the second aspect, in some implementations of the second aspect, when the third information indicates the capability parameter identifier to which the first device is adjusted or needs to be adjusted, the third information includes at least one of the following: a band combination list identifier, a band combination, a feature set combination identifier corresponding to the band combination, a per band feature set identifier corresponding to a band in the band combination, and a per component carrier feature set identifier corresponding to a component carrier on the band in the band combination.

With reference to the second aspect, in some implementations of the second aspect, the method further includes: The second device sends response information to the first device. The response information indicates that the second device allows a capability of the first device to be adjusted to a capability parameter set corresponding to the capability parameter set identifier or adjusted to a capability parameter corresponding to the capability parameter identifier. Then the second device communicates with the first device whose capability parameter set or capability parameter is adjusted.

According to a third aspect, a communication apparatus is provided, including a transceiver unit and a processing unit. The transceiver unit is configured to send first information to a second device. The first information includes N capability parameter sets different from a first capability. The capability parameter set is supported by a first device when used by the first device to request capability adjustment from the second device based on a requirement. The first capability is a maximum capability supported by the first device. N is an integer greater than or equal to 1.

Optionally, the N capability parameter sets include at least one of the following parameters: N band combination lists, where the band combination list includes at least one band combination; N feature set combinations, where the N feature set combinations are associated with one band combination by using corresponding feature set combination identifiers; N feature sets, where the N feature sets correspond to one band in a band combination; and N feature sets per component carrier, where the N feature sets per component carrier correspond to one component carrier on one band in the band combination.

Optionally, the capability parameter sets further include at least one of the following parameters: at least one packet data convergence protocol PDCP sequence number length, at least one radio link control RLC sequence number length, and at least one number of hybrid automatic repeat request HARQ processes.

Optionally, the first information is user equipment UE capability information.

Optionally, when the capability parameter sets include a fallback capability parameter supported by the first capability, the first device supports the fallback capability parameter of the first capability.

Optionally, the first device sends second information to the second device. The second information indicates that the first device supports a fallback capability of the first capability.

The transceiver unit is further configured to send second information to the second device. The second information indicates that the first device supports a fallback capability of the first capability.

Optionally, the processing unit is configured to: determine that a capability of the first device changes, or determine that a capability of the first device needs to change, and the processing unit is further configured to control the transceiver unit to send the first information.

Optionally, the processing unit is configured to: determine that a capability of the first device changes, or determine that a capability of the first device needs to change, and the processing unit is further configured to control the transceiver unit to send third information to the second device. The third information indicates a capability parameter set identifier or capability parameter identifier to which the first device is adjusted or needs to be adjusted. The capability parameter set identifier is an identifier of one of the N capability parameter sets different from the first capability. The capability parameter identifier is an identifier of a capability parameter in the N capability parameter sets different from the first capability.

Optionally, the transceiver unit is further configured to send fourth information to the second device. The fourth information indicates a cause or an objective of capability adjustment of the first device.

Optionally, when the third information indicates the capability parameter identifier to which the first device is adjusted or needs to be adjusted, the third information includes at least one of the following: a band combination list identifier, a band combination, a feature set combination identifier corresponding to the band combination, a per band feature set identifier corresponding to a band in the band combination, and a per component carrier feature set identifier corresponding to a component carrier on the band in the band combination.

Optionally, the transceiver unit is further configured to receive response information from the second device, or the first device receives no response information within first duration after sending the third information. The response information indicates that the second device allows the capability of the first device to be adjusted to a capability parameter set corresponding to the capability parameter set identifier or adjusted to a capability parameter corresponding to the capability parameter identifier. The processing unit controls, based on the adjusted capability parameter set or the adjusted capability parameter, the transceiver unit to communicate with the second device.

According to a fourth aspect, a communication apparatus is provided. The apparatus includes a transceiver unit and a processing unit. The transceiver unit is configured to receive first information from a first device. The first information includes N capability parameter sets different from a first capability. The capability parameter set is a capability parameter set supported by the first device when the first device request capability adjustment from a second device. The first capability is a maximum capability supported by the first device. N is an integer greater than or equal to 1.

Optionally, the N capability parameter sets include at least one of the following parameters: N band combination lists, where the band combination list includes at least one band combination; N feature set combinations, where the N feature set combinations are associated with one band combination by using corresponding feature set combination identifiers; N feature sets, where the N feature sets correspond to one band in a band combination; and N feature sets per component carrier, where the N feature sets per component carrier correspond to one component carrier on one band in the band combination.

Optionally, the capability parameter sets further include at least one of the following parameters: at least one packet data convergence protocol PDCP sequence number length, at least one radio link control RLC sequence number length, and at least one number of hybrid automatic repeat request HARQ processes.

Optionally, the first information is user equipment UE capability information.

Optionally, when the capability parameter sets include a fallback capability parameter supported by the first capability, the first device supports the fallback capability parameter of the first capability.

Optionally, the transceiver unit is further configured to receive second information from the first device. The second information indicates that the first device supports a fallback capability of the first capability.

Optionally, the processing unit is configured to change a configuration of the first device based on the N capability parameter sets different from the first capability.

Optionally, the transceiver unit is further configured to receive third information from the first device. The third information indicates a capability parameter set identifier or capability parameter identifier to which the first device is adjusted or needs to be adjusted. The capability parameter set identifier is an identifier of one of the N capability parameter sets different from the first capability. The capability parameter identifier is an identifier of a capability parameter in the N capability parameter sets different from the first capability. The processing unit is further configured to change a configuration of the first device based on the third information.

Optionally, the transceiver unit is further configured to receive fourth information from the first device. The fourth information indicates a cause or an objective of capability adjustment of the first device.

Optionally, when the third information indicates the capability parameter identifier to which the first device is adjusted or needs to be adjusted, the third information includes at least one of the following: a band combination list identifier, a band combination, a feature set combination identifier corresponding to the band combination, a per band feature set identifier corresponding to a band in the band combination, and a per component carrier feature set identifier corresponding to a component carrier on the band in the band combination.

Optionally, the transceiver unit is further configured to send response information to the first device. The response information indicates that the second device allows the capability of the first device to be adjusted to a capability parameter set corresponding to the capability parameter set identifier or adjusted to a capability parameter corresponding to the capability parameter identifier. The processing unit is configured to control the transceiver unit to communicate with the first device whose capability parameter set or capability parameter is adjusted.

According to a fifth aspect, a communication apparatus is provided, including a transceiver and a processor. Units in the apparatus are respectively configured to perform steps in the method provided in any one of the first aspect, the second aspect, the possible implementations of the first aspect, or the possible implementations of the second aspect.

In a design, the apparatus is a communication chip, and the communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to a sixth aspect, a communication device is provided, including a transceiver, a processor, and a memory. The memory is configured to store a computer program, and the processor is configured to invoke the computer program from the memory and run the computer program, so that the communication device performs the method in any one of the first aspect and the second aspect and the implementations of the first aspect and the second aspect.

Optionally, there are one or more processors, and there are one or more memories.

Optionally, the memory may be integrated with the processor, or the memory and the processor are separately disposed.

According to a seventh aspect, a communication system is provided, including a terminal device and a network device that are provided in the foregoing aspects.

In a possible design, the communication system may further include another device that interacts with the communication device in the solutions provided in embodiments of this application.

According to an eighth aspect, a computer program product is provided. The computer program product includes a computer program (which may also be referred to as code or instructions). When the computer program is run, a computer is enabled to perform the method in any one of the first aspect and the second aspect and the possible implementations of the first aspect and the second aspect.

According to a ninth aspect, a computer-readable medium is provided. The computer-readable medium stores a computer program (which may also be referred to as code or instructions). When the computer program is run on a computer, the computer is enabled to perform the method in any one of the first aspect and the second aspect and the possible implementations of the first aspect and the second aspect.

According to a tenth aspect, a chip system is provided, including a memory and a processor. The memory is configured to store a computer program, and the processor is configured to invoke the computer program from the memory and run the computer program, so that a communication device on which the chip system is installed performs the method in any one of the first aspect and the second aspect and the possible implementations of the first aspect and the second aspect.

The chip system may include an input circuit or interface configured to send information or data, and an output circuit or interface configured to receive information or data.

DESCRIPTION OF EMBODIMENTS

The following describes technical solutions of this application with reference to accompanying drawings.

Figure 1:
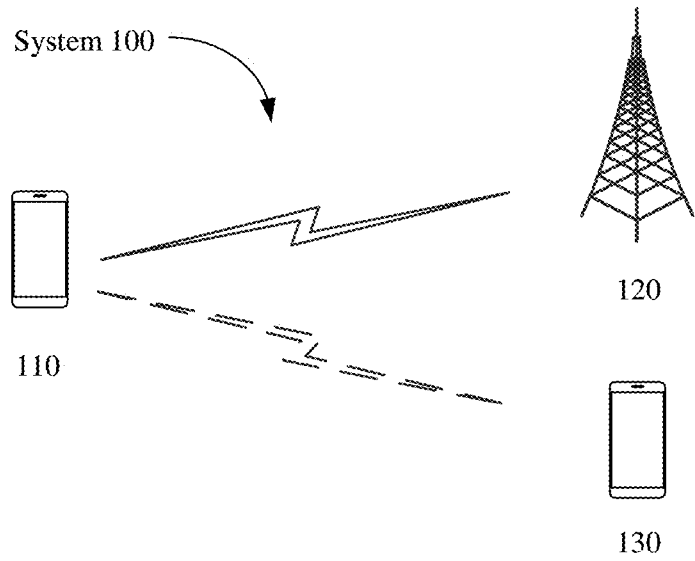
FIG. 1 is a schematic diagram of a communication system 100 to which an embodiment of this application is applicable.

FIG. 1 is a schematic diagram of a communication system 100 to which an embodiment of this application is applicable.

As shown in FIG. 1, the communication system 100 may include at least one network device 120, for example, a network device shown in FIG. 1. The communication system 100 may further include at least one terminal device 110, for example, a terminal device shown in FIG. 1. Connections may be established between the terminal device and the network device, and between the terminal devices for communication. A sending device may indicate scheduling information of data based on control information, so that a receiving device correctly receives the data based on the control information.

Optionally, the communication system 100 includes at least two terminal devices: a terminal device 110 and a terminal device 130. For example, in D2D communication, a scheduled node is a terminal device, and a scheduling node may also be a terminal device.

The terminal device in embodiments of this application may also be user equipment, an access terminal, a subscriber unit, a subscriber station, a mobile station, a mobile console, a remote station, a remote terminal, a mobile device, a user terminal, a wireless communication device, a user agent, or a user apparatus. The terminal in embodiments of this application may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, a cellular phone, a cordless phone, a session initiation protocol (session initiation protocol, SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a 5G network, a terminal in a future-evolved network, or the like.

The wearable device may also be referred to as a wearable smart device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, or smart jewelry for monitoring physical signs.

In addition, the terminal device may alternatively be a terminal device in an internet of things (IoT) system. An IoT is an important part in future development of information technologies. A main technical feature of the IoT is to connect things to a network by using a communication technology, to implement an intelligent network for human-machine interconnection and thing-thing interconnection. A specific form of the terminal device is not limited in this application.

It should be understood that, in embodiments of this application, the terminal device may be an apparatus configured to implement a function of the terminal device, or may be an apparatus that can support the terminal device in implementing the function, for example, a chip system. The apparatus may be installed in the terminal. In this embodiment of this application, the chip system may include a chip, or may include a chip and another discrete component.

The network device in embodiments of this application may be any device having a wireless transceiver function. The device includes but is not limited to: an evolved NodeB (eNB), a radio network controller (RNC), a NodeB (NB), a base station controller (BSC), a base transceiver station (BTS), a home NodeB (for example, a Home evolved NodeB, or a Home NodeB, HNB), a baseband unit (BBU), an access point (AP), a wireless relay node, a wireless backhaul node, a transmission point (TP) or a transmission reception point (TRP) in a wireless fidelity (Wi-Fi) system, and the like. The device may alternatively be a gNB or a transmission point (TRP or TP) in a 5G system, for example, an NR system, one antenna panel or a group of antenna panels (including a plurality of antenna panels) of a base station in the 5G system, or the device may alternatively be a network node that constitutes a gNB or a transmission point, for example, a baseband unit (BBU) or a distributed unit (DU).

In some deployments, a gNB may include a central unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

It should be understood that in embodiments of this application, the network device may be an apparatus configured to implement a function of the network device, or may be an apparatus that can support the network device in implementing the function, for example, a chip system. The apparatus may be installed in the network device.

The technical solutions in embodiments of this application may be applied to various communication systems such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex ( ) system, a universal mobile telecommunications system (UMTS), a worldwide interoperability for microwave access (WiMAX) communication system, a 5th generation (5G) system or a future-evolved communication system, a vehicle-to-everything (V2X) system, a long term evolution-vehicle (LTE-V) system, an internet of vehicles system, machine type communication (MTC) system, an internet of things (IoT) system, a long term evolution-machine (LTE-M) system, a machine-to-machine (M2M) system, and a device-to-device (D2D) system, where V2X may include vehicle-to-network (V2N), vehicle-to-vehicle (V2V), vehicle-to-infrastructure (V2I), vehicle-to-pedestrian (V2P), and the like.

It should be understood that this application may be applied to an independently deployed 5G or LTE system, or may be applied to a 5G or LTE system that is not independently deployed, for example, a DC scenario, including a dual connectivity (E-UTRA-NR dual connectivity, EN-DC) scenario and a carrier aggregation (CA) scenario.

Figure 2:
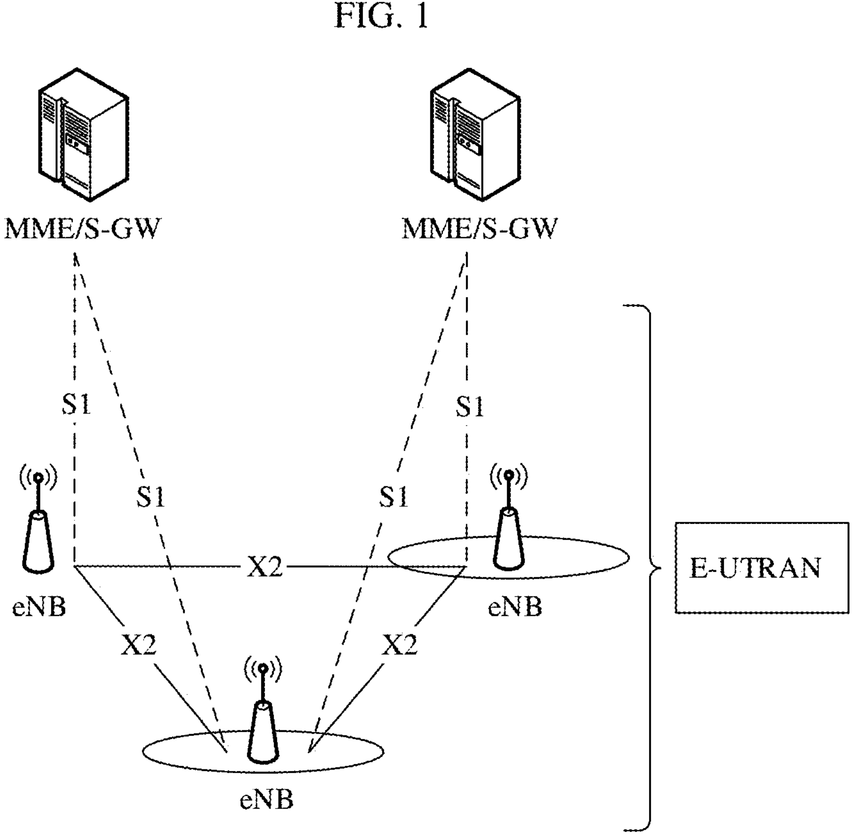
FIG. 2 is a schematic diagram of an LTE system architecture to which an embodiment of this application is applicable.

FIG. 2 is a schematic diagram of an LTE system architecture to which an embodiment of this application is applicable.

A mobility management entity (MME) in FIG. 2 performs functions: sending of a paging message to a corresponding eNB, mobility control in an idle state, encryption and integrity protection of non-access stratum signaling, and the like. A serving gateway (SGW) supports user plane data exchange for UE mobility, and the like. An S1 interface is located between the eNB and the MME/SGW, to connect the eNB to the MME. The S1 interface mainly implements functions including radio access bearer control, interface-specific operation and maintenance of the S1 interface, and the like. The eNBs are interconnected through an X2 interface to form a mesh network.

Figure 3:
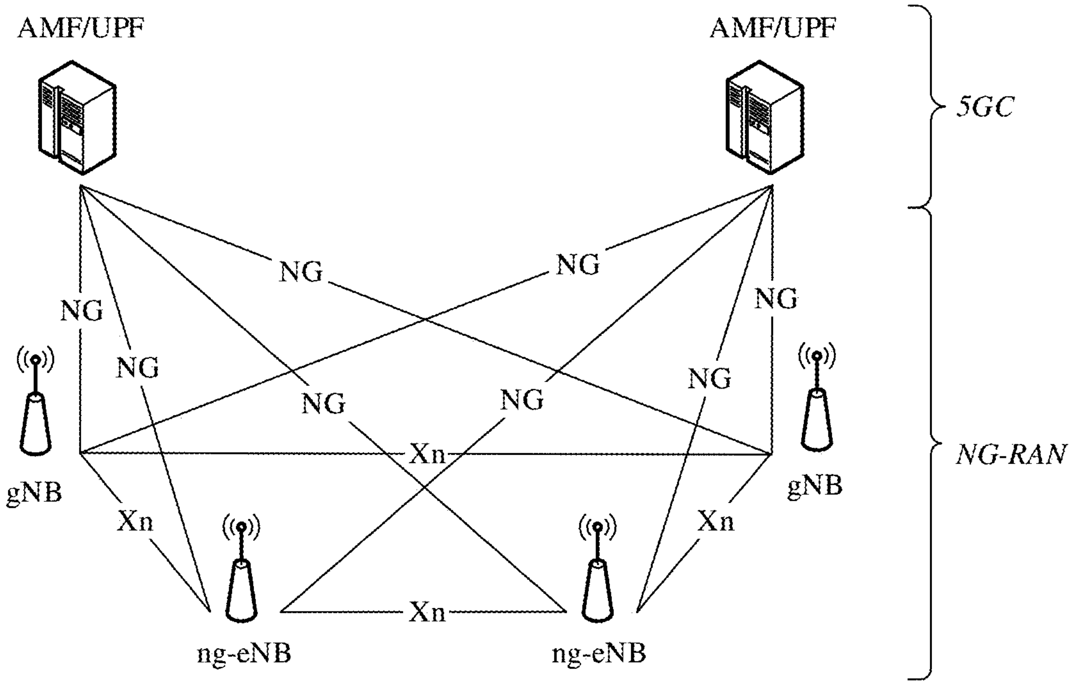
FIG. 3 is a schematic diagram of a 5G system architecture to which an embodiment of this application is applicable.

FIG. 3 is a schematic diagram of a 5G system architecture to which an embodiment of this application is applicable.

A gNB in FIG. 3 is a node that provides a user plane protocol terminal and a control plane protocol terminal of an NR for UE, and is connected to a 5GC (5G core network) through an NG interface. An ng-eNB is a node that provides a user plane protocol terminal and a control plane protocol terminal of an evolved universal terrestrial radio access network (E-UTRA) for the UE, and is connected to the 5GC through the NG interface. An access and mobility management function (AMF) is responsible for NAS message encryption and integrity protection, registration, access, mobility, authentication, and transparent transfer of an SMS message, and may be similar to a 4G MME entity. A user plane function (UPF), as an interface that connects to a data network, implements functions including user plane data forwarding, session/flow-based charging statistics, bandwidth limitation, and the like, that is, packet routing and forwarding, quality of service (QoS) processing of user plane data, and the like. The gNBs are interconnected through an Xn interface.

Figure 4:
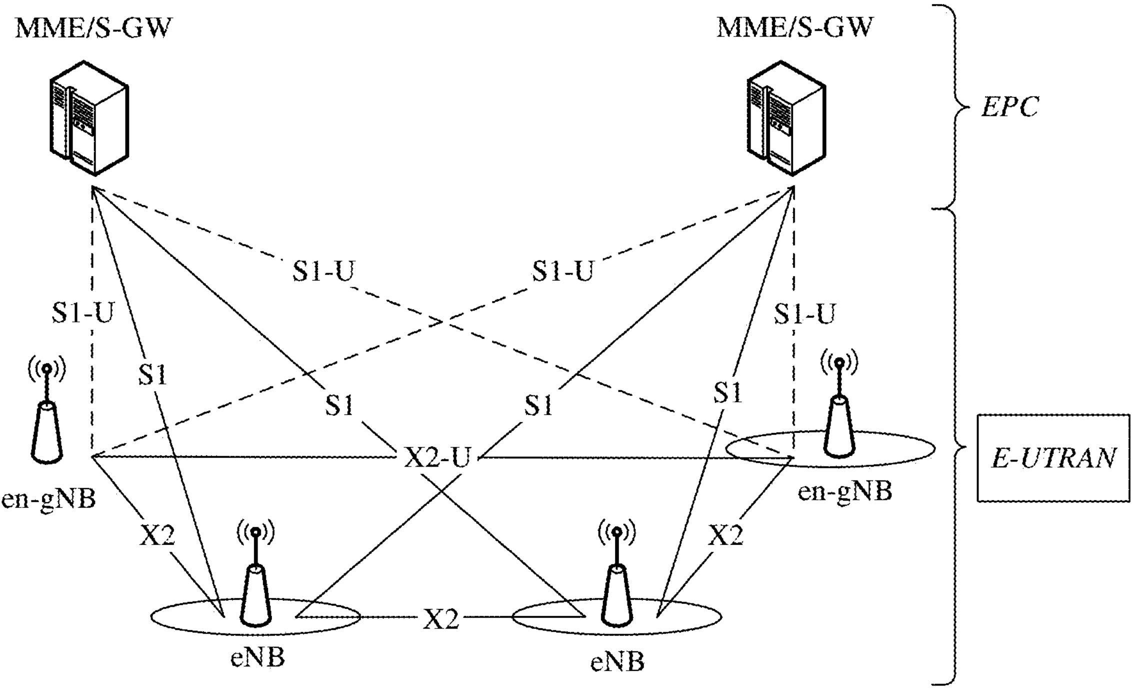
FIG. 4 is a schematic diagram of an EN-DC scenario applicable to an embodiment of this application.

FIG. 4 is a schematic diagram of an EN-DC scenario applicable to an embodiment of this application.

In an EN-DC mode, a 5G NR control plane is anchored to a 4G LTE, and a 5G NR is used to carry a service on a user plane. The control plane is a channel for sending signaling required for resource scheduling, and the user plane is a channel for transmitting user data. In NSA networking, a 5G base station is attached to an existing 4G core network.

An LTE base station eNB serves as an MN, and an NR base station gNB serves as an SN. There is an S1 interface between the LTE eNB and an evolved packet core (EPC) of an LTE system, there is at least a control (S1-Control, S1-C) plane connection, and there may be further a user plane (S1-user plane, S1-U) connection. There is an S1-U interface between the NR gNB and the EPC. That is, there may be only a user plane connection.

Figure 5:
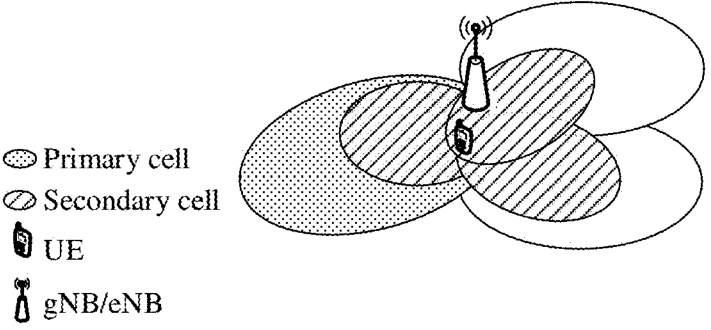
FIG. 5 is a schematic diagram of a CA scenario applicable to an embodiment of this application.

FIG. 5 is a schematic diagram of a CA scenario applicable to an embodiment of this application.

In the CA scenario, cells may be classified into primary cells and secondary cells, and the primary cell is a cell operating on a primary band. UE performs an initial connection establishment procedure or initiates a connection re-establishment procedure in the cell. In a handover process, the cell is indicated as a primary cell. The secondary cell is a cell operating on a secondary band. Once an RRC connection is established, the secondary cell may be configured to provide additional radio resources.

Figure 6:
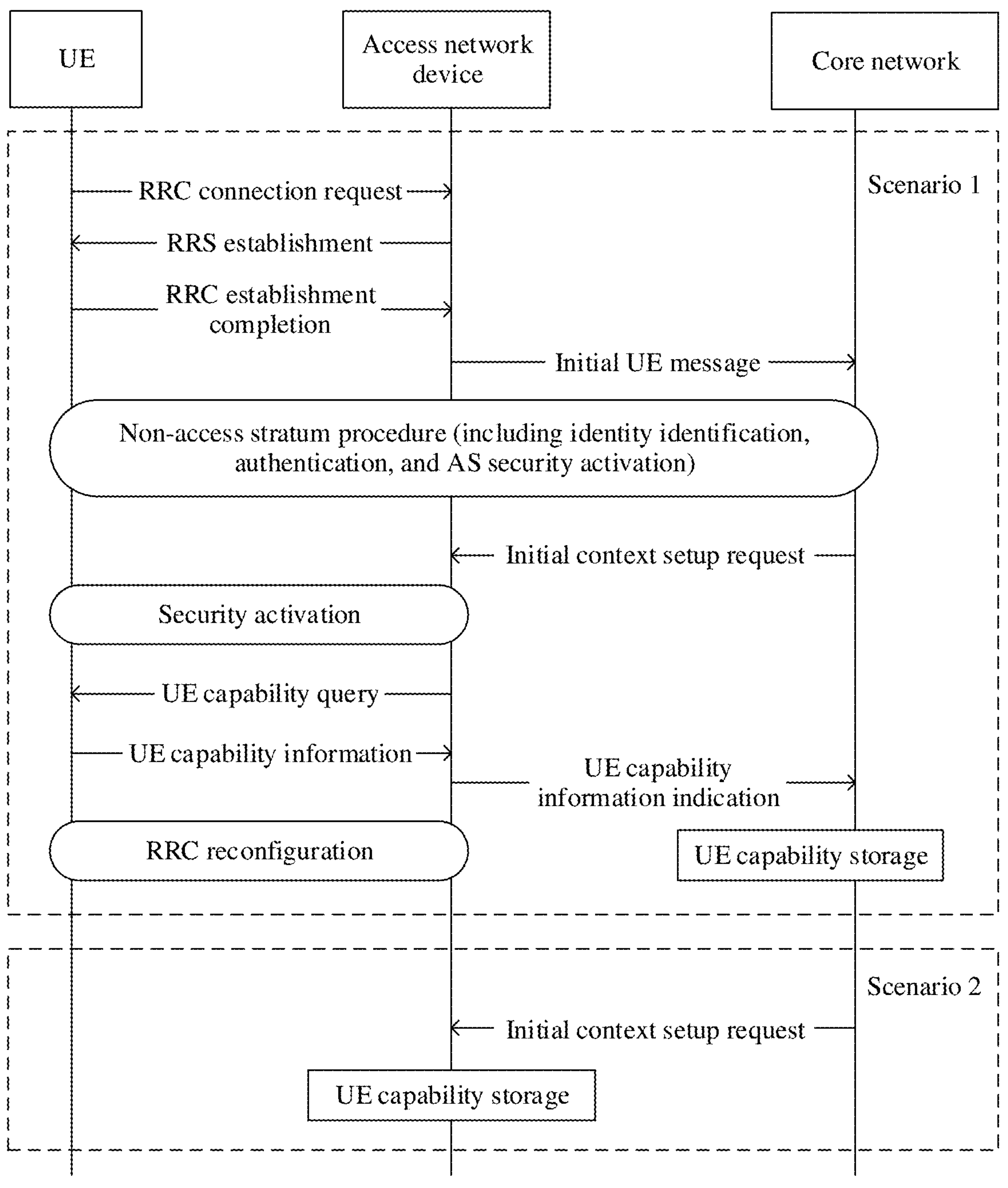
FIG. 6 is a flowchart of UE capability query and reporting applicable to an embodiment of this application.

FIG. 6 is a flowchart of UE capability query and reporting applicable to an embodiment of this application.

In a wireless communication system, a network device needs to learn of capability information of UE, for example, a radio access-related capability of the UE or a core network-related capability of the UE. Because each UE has a different capability, the UE reports the capability information to the network device after establishing a connection. The core network capability of the UE is sent to the network device by using an RRC establishment complete message when an RRC connection is established, and then the network device sends the core network capability to a core network by using an initial UE message.

There are two scenarios for UE radio capability query and reporting:

Scenario 1: If there is no UE radio capability information in the core network, and there is no available UE radio capability information in the network device, the network device is triggered to send a UE capability query message (UECapabiliyEnquiry) to the UE, and the UE reports UE capability information (UECapabilityInformation) to the network device. The capability information includes the UE radio capability information. The network device sends a UE radio capability to the core network by using the UE capability message, and the core network stores the UE radio capability.

Scenario 2: If the core network stores UE radio capability information, a UE radio capability is sent to the network device in an initial context setup request.

Figure 7:
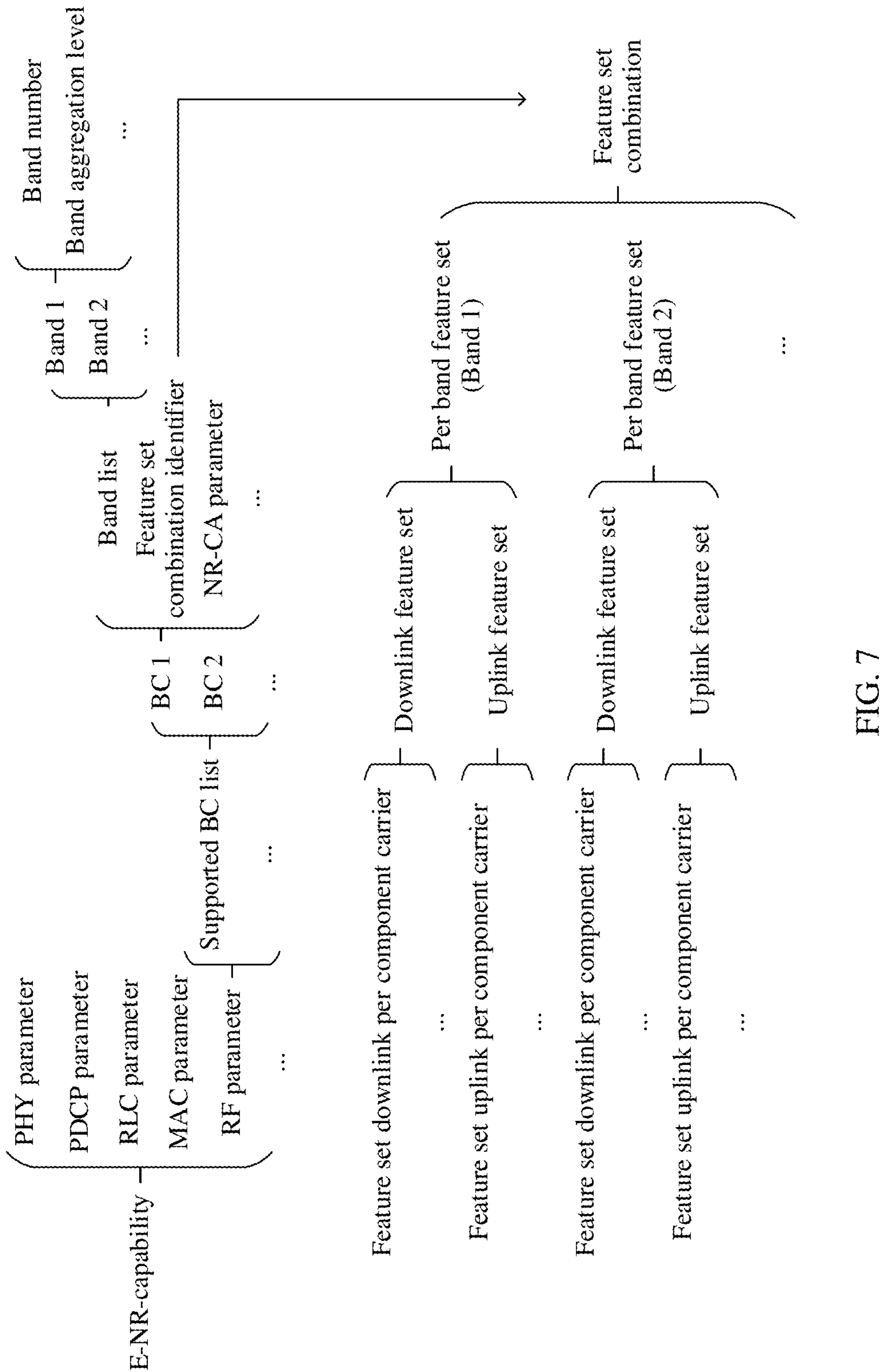
FIG. 7 is a schematic diagram of a structure of capability report information applicable to an embodiment of this application.

FIG. 7 is a schematic diagram of a structure of a UE capability report applicable to an embodiment of this application.

In some embodiments, if a network device requests an Nr-rat (5G) standard in a reqRatList field in a UE capability query message, UE needs to report a 5G standard capability in UE capability information. If a network device requests an Eutra-Nr-rat (4G-5G hybrid networking) standard capability in a reqRatList field in a UE capability query message, UE needs to report an Eutra-Nr-rat capability in UE capability information. If a network device requests an Eutra-rat (4G) standard capability in a reqRatList field in a UE capability query message, UE needs to report a 4G standard capability in UE capability information.

An Nr-rat capability report mainly includes a physical layer parameter (PHY-Parameters), a radio frequency parameter (RF-Parameters), a packet data convergence protocol parameter (PDCP-Parameters), a radio link control parameter (RLC-Parameters), a media access control parameter (MAC-Parameters), and the like of the UE.

A capability support band list (supportBandCombinationList) is included in the RF-Parameters. This capability item indicates a band combination (BC) list that can be supported by the UE. In some embodiments, the capability item indicates that the UE can normally start a service in a band combination in the band combination list.

The band combination capability includes a band list, an NR carrier aggregation parameter (caParametersNR), a feature set combination identifier, and the like. As shown in FIG. 7, the band list indicates information about each band that forms a band combination, and basic information of each band includes a band number and a carrier aggregation level. The carrier aggregation level indicates a maximum number of contiguous aggregated carriers on this band, a maximum aggregated bandwidth, and the like. The NR carrier aggregation parameter indicates a capability parameter related to carrier aggregation on an NR band. The feature set combination (FSC) identifier indicates a feature set combination corresponding to the band combination. A per band feature set in the feature set combination indicates a specific capability parameter (which may also be referred to as a specification) of each band in a band combination. A downlink capability parameter of the band is indexed by using an identifier of a downlink feature set included in the per band feature set, and an uplink capability parameter of the band is indexed by using an identifier of an uplink feature set included in the per band feature set.

A downlink capability parameter of each downlink carrier on the band is indexed by using a feature set downlink per component carrier identifier in the downlink feature set. An uplink capability parameter of each uplink carrier on the band is indexed by using a feature set uplink per component carrier identifier in the uplink feature set. If the carrier aggregation level indicates that the maximum number of contiguous aggregated carriers supported by the band is K, the uplink/downlink feature set of the band includes K feature set uplink per component carrier identifiers/feature set downlink per component carrier identifiers.

It should be noted that, the uplink/downlink feature set identifier and the feature set uplink per component carrier identifier/feature set downlink per component carrier identifier are reported in the feature set combination, and the identifiers respectively point to an uplink/downlink feature set capability parameter of a specific band in a feature set pool and a feature set uplink per component carrier capability parameter/feature set downlink per component carrier capability parameter of the band. Beneficial effect of such reporting is that, because a large number of similar capability parameters are included at a band and a component carrier level, signaling overheads can be reduced to a maximum extent by using the identifier for indexing. For example, if a carrier aggregation level of a band A indicates that the band A supports a maximum of four downlink contiguous aggregated carriers, values of four feature set downlink per component carrier identifiers need to be reported in the downlink feature set, and the four identifiers may have the same or different values.

Because there are various carrier aggregation band combinations in an NR, a fallback mechanism is introduced to reduce UE capability signaling overheads.

The following briefly describes concepts used in the fallback mechanism:

Fallback band combination: For a band combination that has a same or lower capability than a reported capability, the UE does not need to report the band combination that has the same or lower capability or a feature set corresponding to the band combination.

Fallback per band feature set: The fallback per band feature set is a per band feature set that has a same or lower capability than a reported capability for a given band.

Fallback per CC feature set: For a given carrier per band, the fallback per CC feature set is a per CC feature set that has fewer MIMO layers and a smaller bandwidth value, but keeps a numerology and other parameters unchanged.

Figure 8:
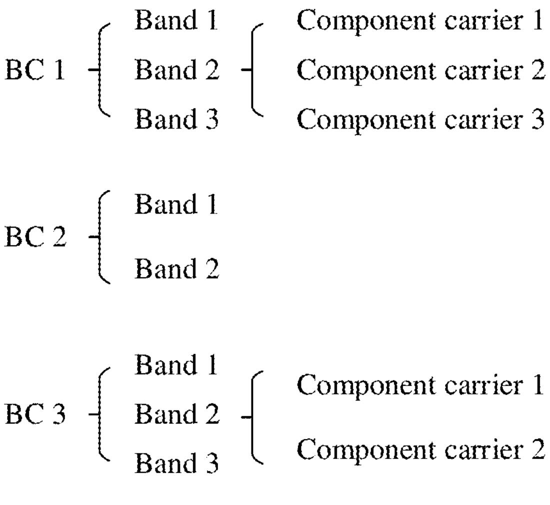
FIG. 8 is a schematic diagram of a fallback band combination applicable to an embodiment of this application.

FIG. 8 is a schematic diagram of a fallback band combination according to an embodiment of this application.

As shown in FIG. 8, a band combination 2 is a fallback band combination obtained by removing a band 3 from a band combination 1. After the band 3 is removed, the band combination 1 and the band combination 2 have a same capability, or the band combination 2 has a lower capability. In this case, the band combination 2 and a feature set corresponding to the band combination 2 do not need to be explicitly reported.

A band combination 3 is a fallback band combination obtained by removing a component carrier on a band 2 from the band combination 1. The band combination 1 and the band combination 3 support a same band. However, the band combination 1 supports a maximum of three component carriers on the band 2, and the band combination 3 supports a maximum of two of the three component carriers on the band 2. Compared with the band combination 1, the band combination 3 has a same or lower capability. In this case, the band combination 3 and a feature set corresponding to the band combination 3 do not need to be explicitly reported.

Feature set aggregation mechanism: To further reduce signaling overhead, band combinations that support same or similar band numbers and capabilities at a same band combination level (such as ca-ParametersNR) but have different capabilities per band or per component carrier can be associated with a same feature set. A plurality of band combinations with different capabilities are distinguished by using a plurality of feature sets.

For example, the band combination 1 is a super band combination of the band combination 2. If the band combination 1 and the band combination 2 have different band numbers (for example, the band combination 1 supports a band 1, the band 2, and the band 3, and the band combination 2 supports the band 1 and the band 2), but have same capability parameters at other band combination levels, both the band combination 1 and the band combination 2 may be associated with a same feature set combination. A number of per band feature sets in a feature set combination is the same as a number of bands in a super band combination. The per band feature sets respectively correspond to the band 1, the band 2, and the band 3. Each per band feature set includes a feature set 1 and a feature set 2, which respectively one-to-one correspond to the band combination 1 and the band combination 2. Each feature set includes an uplink/downlink feature set, and the uplink/downlink feature set includes a feature set uplink per component carrier/feature set downlink per component carrier. Therefore, the band combination 2 does not need to be explicitly reported, but capabilities of two band combinations are explicitly indicated by two feature sets corresponding to the per band feature set.

In the preceding example, bands in the band combination 1 and the band combination 2 may be the same or different. When the bands are different, for example, when the band combination 2 includes only the band 1 and the band 2, but does not include the band 3, an uplink/downlink feature set identifier in a feature set 2 (corresponding to the band combination 2) of a per band feature set corresponding to the band 3 may be set to 0, to indicate that the band combination does not include the band 3.

The preceding paragraphs mainly describe a UE capability query and reporting procedure, and a specific structure and meaning of UE capability reporting signaling.

When a UE radio capability is updated, a "mobility registration update" procedure is performed to update the capability. However, in this process, the UE needs to re-register with a network, which results in interruption of a current service, and greatly affects user experience.

In addition, in some scenarios, the UE expects to change a capability more dynamically and flexibly based on a requirement of the UE. For example, in order to avoid overheating of the UE or in order to save power, the UE expects to reduce a peak rate, a carrier aggregation capability, and a MIMO capability. Alternatively, when some RF resources and baseband resources of the UE are occupied by a high-priority service of another system due to a hardware sharing requirement (dual-SIM capability sharing, internet of vehicles capability sharing, and the like), a carrier aggregation capability (a band combination supported by the UE, a number of carriers, or another CA capability parameter) of the UE needs to be changed, and a dual connectivity capability, a DAPS handover capability, and the like of the UE need to be changed. Alternatively, when the UE is severely interfered, a carrier frequency needs to be changed. Alternatively, the UE is adjusted from an enhanced mobile broadband service to a low-latency and high-reliability service, an internet of vehicles service, a reduced-capability service, or the like based on a service requirement, to change a capability and the like.

The UE recommends, to a network device based on assistance information, a configuration expected by the UE. The assistance information of the UE may be used to resolve an overheating problem. In other words, the UE reports a smaller maximum aggregated bandwidth, a maximum number of carriers, a discontinuous reception (DRX) configuration, or the like. Alternatively, the assistance information of the UE is used to report a carrier frequency at which the UE is interfered, or the like. The assistance information of the UE is used to: avoid updating the capability through the registration procedure, and avoid an unnecessary delay and signaling overheads.

However, because the assistance information is limited, signaling overheads are large when the UE needs to update a large number of capability parameters. In addition, the autonomy of capability adjustment of the UE is low. Whether to use the assistance information reported by the UE is determined by the network device, that is, the UE does not know whether the network device performs reconfiguration based on the assistance information reported by the UE. It is very likely that the network device does not implement reconfiguration to reduce scheduling complexity. In addition, the assistance information of the UE cannot well support flexible switching of the UE between different capabilities.

For the foregoing scenario, this application provides a communication method that can support flexible switching of the UE between different capabilities.

Figure 9:
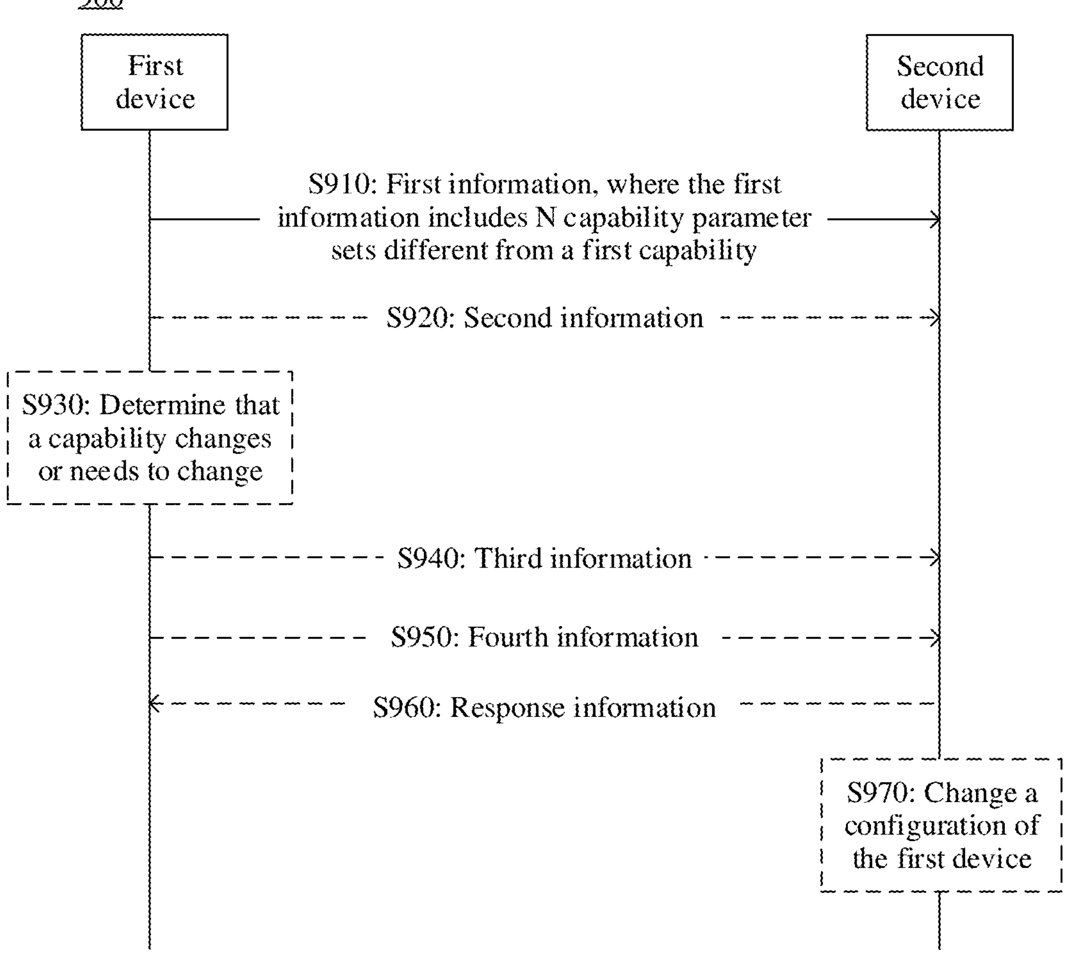
FIG. 9 is a schematic flowchart of a communication method applicable to an embodiment of this application.

FIG. 9 is a schematic flowchart of a communication method according to an embodiment of this application. The method 900 includes the following steps.

S910: A first device sends first information to a second device. The first information includes N capability parameter sets different from a first capability. The capability parameter set is a capability parameter set supported by the first device when the first device request capability adjustment from the second device. The first capability is a maximum capability supported by the first device. N is an integer greater than or equal to 1.

Optionally, after receiving a UE capability query message sent by a base station, UE reports the N capability parameter sets in the first information. The first information is UE capability information (UECapabilityInformation). The UECapabilityInformation includes UE radio capability information.

It should be understood that the N capability parameter sets may indicate N capabilities different from the maximum capability. The N capabilities may be applied to scenarios including hardware capability sharing, overheating, supercooling, power saving, interference, service adjustment, and the like. Certainly, the foregoing scenario is merely an example. This is not particularly limited in this application.

For example, the first device is UE. In a dual-SIM capability sharing scenario, a SIM card 1 and a SIM card 2 share a hardware resource that includes a radio frequency resource and a baseband resource. When a dual-SIM concurrent service occurs, for example, when the SIM card 1 first starts a service, and the SIM card 1 detects that the SIM card 2 is to start a service, the SIM card 1 communicates with a network device based on a capability lower than a maximum capability of the SIM card 1. When the concurrent service stops, the SIM card 1 may restore to a higher capability to communicate with the network device. Therefore, when the UE reports a UE capability, for each SIM card, the UE needs to report both a maximum capability obtained when a single SIM card works and a capability obtained when a plurality of SIM cards work together. Because the hardware resource is shared between the plurality of SIM cards, the capability obtained when the plurality of SIM cards work together is different from the maximum capability obtained when the single SIM card works independently.

Similarly, in scenarios including overheating, supercooling, in-device multi-RAT coexistence, power saving of the UE, and the like, the UE capability changes based on a requirement. Therefore, the UE needs to report a plurality of capabilities, so that the UE can flexibly switch between the plurality of capabilities.

Optionally, the N capability parameter sets include at least one of the following RF parameters: N band combination lists, where the band combination list includes at least one band combination; N feature set combinations, where the N feature set combinations are associated with one band combination by using corresponding feature set combination identifiers; N feature sets, where the N feature sets correspond to one band in a band combination; and N feature sets per component carrier, where the N feature sets per component carrier correspond to one component carrier on one band in a band combination.

In some embodiments, the first device reports N band combination lists supported for capability adjustment. The N band combination lists are different from a band combination list reported by the first device based on the maximum capability. In some embodiments, band combinations included in the band combination lists may be different, or band combinations included in the band combination lists may be the same but capabilities of the band combinations are different. Band combinations included in the N band combination lists may overlap. In some embodiments, two or more band combination lists in the N band combination lists may include same band combinations, and capabilities of the same band combinations may be the same or may be different.

Alternatively, the first device reports N feature set combination identifiers. In other words, the first device associates the N feature set combination identifiers with one band combination in the band combination list. For example, in addition to reporting that a band combination 1 is associated with a feature set combination identifier 1 based on the maximum capability, the first device further reports that the band combination 1 may be associated with a feature set combination identifier 2 and a feature set combination identifier 3. A feature set combination 2 and a feature set combination 3 indexed by using the feature set combination identifier 2 and the feature set combination identifier 3 support UE capabilities different from a capability supported by a feature set combination 1. In some embodiments, bands included in the feature set combinations have different capabilities, or component carriers included in bands have different capabilities.

At a band combination level, the UE may further report a plurality of capabilities based on other parameters included in the band combination. For example, for a carrier aggregation capability, at least one reduced-capability NR carrier aggregation parameter may be reported.

Alternatively, the first device reports the N feature sets. In some embodiments, the first device reports N feature sets and corresponding FeatureSetDownlink and/or FeatureSetUplink in a feature set combination associated with a band combination, for example, in FeatureSetsPerB and corresponding to a band in the band combination. The N feature sets include a capability parameter that is of the band and that is different from the maximum capability. The N feature sets are used for capability adjustment.

Alternatively, the first device reports the N feature sets per component carrier. In some embodiments, the first device reports N feature sets downlink per component carrier FeatureSetDownlinkPerCC and/or feature sets uplink per component carrier FeatureSetUplinkPerCC in a feature set combination associated with a band combination, for example, in a downlink feature set FeatureSetDownlink and/or an uplink feature set FeatureSetUplink corresponding to a band in the band combination. The N feature sets downlink per component carrier FeatureSetDownlinkPerCC and/or feature sets uplink per component carrier FeatureSetUplinkPerCC include capability parameters that are of component carriers on the band and that are different from the maximum capability, and are used for capability adjustment.

In a possible implementation, when the capability parameter sets include a fallback capability parameter supported by the first capability, the first device supports the fallback capability parameter of the first capability. For example, when a band combination in the N band combination lists reported by the first device includes a fallback band combination of a band combination supported by the first capability, the UE still supports the fallback band combination of the first capability. It is assumed that in addition to a band combination list 1 reported based on the maximum capability, the first device further reports a band combination list 2 and a band combination list 3. If a band combination in the band combination list 2 and a band combination in the band combination list 3 have capabilities that are the same as or lower than a capability of a band combination in the band combination list 1, the second device cannot consider that the first device does not support a capability fallback reporting mechanism. When the first device works at the maximum capability, the first device may support a capability of a fallback band combination of a band combination in the band combination list 1 corresponding to the maximum capability, where the capability includes a capability of a band combination that is explicitly reported in another band combination list (for example, the band combination list 2 or the band combination list 3). When the first device is in a dual-SIM concurrent mode, the first device also supports a capability of a fallback band combination of a band combination in the band combination list 2, where the capability includes a capability of a band combination that is reported in another band combination list (for example, the band combination list 3). For example, when the N feature sets include a fallback per band feature set of a per band feature set supported by the first capability, the first device still supports the fallback per band feature set of the first capability, that is, the second device cannot consider that the first device does not support the fallback capability reporting mechanism. For example, when the N feature sets per component carrier include a fallback per component carrier feature set of a per component carrier feature set supported by the first capability, the first device still supports all fallback per component carrier feature sets of the first capability, that is, the second device cannot consider that the first device does not support the fallback capability reporting mechanism.

In another possible implementation, S920: The first device sends second information to the second device, where the second information indicates that the first device supports a fallback capability of the first capability. In the foregoing possible implementation, the N capability parameter sets include or do not include the fallback capability parameter supported by the first capability, the first device supports the fallback capability of the first capability, and the second device needs to consider that the first device supports the fallback capability of the first capability. In another possible implementation, the second information explicitly indicates that the first device supports the fallback capability of the first capability.

Optionally, in addition to the RF parameter, the N capability parameter sets further include at least one of the following: at least one packet data convergence protocol (PDCP) sequence number length, at least one radio link control (RLC) sequence number length, and at least one number of hybrid automatic repeat request (HARQ) processes.

It should be understood that, it is assumed that a parameter set of the maximum capability reported by the first device includes X capability parameters, different values are reported for only M capability parameters that may change in the N capability parameter sets, and M≤X. In the foregoing optional solution, M=4.

Certainly, the N capability parameter sets may further include other capability parameters classified based on a protocol layer and a working mode. These capability parameters may include a transmit capability and a receive capability, and may include a baseband processing capability and an RF capability, and may include a number of antennas, a transmit power class, a supplementary uplink carrier (SUL) related parameter, a dual connectivity (DC) related parameter, a band related parameter, a DRX configuration, a number of MIMO layers, a bandwidth, a number of aggregated carriers, a modulation order, a duplex mode, an offset parameter scheduled and processed at a physical layer, a reference signal configuration, and the like. The foregoing parameters are merely examples. The N capability parameter sets may further include another parameter used to represent a capability of the first device. This is not limited in this application.

Optionally, the N capability parameter sets correspond to a capability mode of the first device. Each capability mode corresponds to one capability parameter set, and the capability mode further corresponds to a capability adjustment cause or a capability adjustment objective, and is, for example, a capability mode applicable to a case in which the first device is supercooled or has an excessively low temperature; a capability mode applicable to a case in which the first device is overheated or has an excessively high temperature; a capability mode applicable to energy saving; a capability mode applicable to NR and wireless local area network (WLAN) capability sharing; a capability mode applicable to multi-subscriber identity module (SIM) capability sharing; a capability mode applicable to vehicle to everything (V2X) capability sharing; a capability mode applicable to an ultra-high reliability and low latency (URLLC) service; and a capability mode applicable to a reduced-capability (REDCAP) service. Certainly, the capability mode may further include other modes, and examples are not provided one by one herein.

For example, each capability mode may be associated with a specific band combination, and/or a feature set combination, and/or a per band feature set, and/or a per CC feature set. For example, when the UE capability information is reported, each capability mode is associated with band combination lists of different capabilities, and the UE reports the band combination list supported by each capability mode, for example, reports the band combination list 1 supported by a capability mode 1. The band combination list 1 includes a band combination 1 and a band combination 2. A capability mode 2 supports the band combination list 2. The band combination list 2 includes a band combination 1 and a band combination 3.

Alternatively, each capability mode may be associated with a corresponding feature set combination identifier. For example, the UE indicates, in the capability information, a feature set combination identifier associated with a band combination in each capability mode. For example, if the UE has three band combinations, the UE indicates, in a capability mode 1, that a band combination 1 is associated with a feature set combination 1, a band combination 2 is associated with the feature set combination 1, and a band combination 3 is associated with a feature set combination 2, or indicates, in a capability mode 2, that a band combination 1 is associated with a feature set combination 1, a band combination 2 is associated with a feature set combination 2, and a band combination 3 is associated with a feature set combination 3.

Alternatively, each capability mode may be associated with per band feature sets of different capabilities. For example, the UE reports a feature set identifier associated with each band in a band combination, and indicates that the feature set identifier is associated with a specific capability mode. For example, if the UE has one band 1 in a band combination 1, in a capability mode 1, the band 1 corresponds to a feature set associated with a feature set identifier 1; or in a capability mode 2, the band 1 corresponds to a feature set associated with a feature set identifier 2.

Alternatively, each capability mode may be associated with a per CC feature set. For example, the UE reports a feature set downlink per component carrier FeatureSetDownlinkPerCC identifier and/or a feature set uplink per component carrier FeatureSetUplinkPerCC identifier that are/is associated with each component carrier on a band in a band combination, and indicates that the feature set downlink per component carrier FeatureSetDownlinkPerCC identifier and/or the feature set uplink per component carrier FeatureSetUplinkPerCC identifier are/is associated with a specific capability mode. For example, if the UE has one band 1 in a band combination 1, and there is one component carrier 1 on the band 1, in a capability mode 1, a downlink feature set corresponding to the component carrier 1 is a feature set downlink per component carrier identifier 1, and an uplink feature set corresponding to the component carrier 1 is a feature set uplink per component carrier identifier 1; or in a capability mode 2, a downlink feature set corresponding to the component carrier 1 is a feature set downlink per component carrier identifier 2, and an uplink feature set corresponding to the component carrier 1 is a CC feature set downlink per component carrier identifier 2.

Optionally, in addition to a corresponding radio frequency capability parameter associated in the foregoing manner in a capability parameter set associated with a capability mode, the capability parameter set associated with the capability mode of the first device may further include the following capability parameters different from the maximum capability. For example, in an overheating mode, one or more of the following parameters are included: a DRX configuration different from the maximum capability, an offset parameter scheduling and processing capability at a physical layer, a maximum number of uplink/downlink carriers, and a number of MIMO layers. In a supercooling mode, one or more of the following parameters are included: a number of MIMO layers, a maximum number of uplink/downlink carriers, a maximum uplink/downlink bandwidth, a maximum subcarrier spacing, a mini-slot-related parameter, and a supported band number. For dual-SIM capability sharing, a transmit capability and a receive capability obtained in a dual-SIM concurrent mode are included, and one or more of the following capability parameters are included: a number of HARQ processes, a PDCP sequence length, an RLC sequence length in an acknowledgement mode, a channel state information (CSI) processing capability, a network-assisted interference cancellation and suppression ( ) capability, a reference signal configuration used for measurement, a dual connectivity (DC) capability, a UE category (UE CAT), a MIMO capability, a channel sounding reference signal (SRS) sending switching capability, a maximum number of uplink/downlink carriers, a maximum uplink/downlink bandwidth, a number of MIMO layers, a transmit power class, and a supplementary uplink carrier (SUL) parameter. For reduced-capability UE, one or more of the following capability parameters are included: a bandwidth supported by a reduced capability, a number of transmit and receive antennas, uplink and downlink modulation orders, and a duplex mode.

Optionally, the method 900 further includes the following steps.

S930: The first device determines that a capability changes, or determines that a capability of the first device needs to change, for example, when the first device enters the dual-SIM concurrent mode, or enters an internet of vehicles service, to occupy some baseband resources or RF resources, overheating/supercooling occurs, the first device is used to save power, in-device coexistence interference occurs, the UE is adjusted to reduced-capability UE, or a service is adjusted to a low-latency and high-reliability service.

S940: The first device sends third information to the second device after determining that the capability changes or determining that the capability of the first device needs to change. Correspondingly, the second device receives the third information. The third information indicates a capability parameter set identifier or capability parameter identifier to which the first device is adjusted or needs to be adjusted. The capability parameter set identifier is an identifier of one of the N capability parameter sets different from the first capability. The capability parameter identifier is an identifier of a capability parameter in the N capability parameter sets different from the first capability. It should be understood that, if a capability parameter set reported by the first device is associated with a capability mode of the first device, when the first device determines that the capability changes, the first device indicates, to the second device, a capability mode to which the first device is adjusted or needs to be adjusted. For example, if the capability mode 1 is indicated, it indicates a capability parameter set corresponding to the capability mode 1 to which the first device is adjusted or needs to be adjusted. For example, the RF parameter may be a band combination list (including a currently working band combination) supported by a capability to which a capability of the first device is adjusted or needs to be adjusted, and/or a supported feature set combination, and/or a supported per band feature set, and/or a supported per CC feature set.

In this manner, the capability mode may be directly indicated by lower-layer signaling (a MAC layer or a PHY layer), for example, indicated by a bitmap. For example, there are four capability modes: a capability mode 0 to a capability mode 3, and the four capability modes are indicated by 2-bit bitmaps 00, 01, 10, and 11. This solution can implement faster capability adjustment and lower latency. In the hardware capability sharing scenario, if a high-priority service occupies a part of hardware capability, the capability can be dynamically adjusted more quickly to reduce impact on a current service.

It should be further understood that, when the N capability parameter sets reported by the first device are not associated with the capability mode of the first device, the third information sent by the first device indicates the capability parameter set identifier to which the first device is adjusted or needs to be adjusted. The capability parameter set identifier is an identifier of one of the N capability parameter sets different from the first capability.

It should be further understood that the third information sent by the first device may directly indicate identification information of a capability parameter to which the first device is adjusted or needs to be adjusted.

Optionally, the capability parameter identifier indicated by the third information includes at least one of the following: a band combination list identifier, a band combination, a feature set combination identifier corresponding to a band combination, a per band feature set identifier corresponding to a band in a band combination, and a per CC feature set identifier corresponding to a component carrier on a band in a band combination.

Optionally, the method 900 further includes the following step.

S950: The first device sends fourth information to the second device. The fourth information indicates a cause or an objective of capability adjustment of the first device. The cause or objective of capability adjustment includes at least one of the following: hardware capability sharing, overheating, supercooling, power saving, interference, UE category adjustment, and a service type change.

It should be understood that the fourth information and the first information may be same information, the fourth information and the first information may be carried in a same message, the fourth information and the first information may be different information, or the fourth information and the first information are carried in different messages. The fourth information and the third information may be same information, the fourth information and the third information are carried in a same message, the fourth information and the third information may be different information, or the fourth information and the third information are carried in different messages. This is not particularly limited in this application.

In a possible implementation, in the step S910, the first device reports one reduced-capability band combination list. The reduced-capability band combination list includes reduced-capability band combinations that may be used in all scenarios. When the capability of the first device changes, the third information sent by the first device to the second device indicates indexes of one or more band combinations (which should include a currently working band combination) supported by the adjusted capability, or indicates an index of a currently suspending band combination. Suspending indicates that the UE does not support the band combination temporarily.

In another possible implementation, in the step S910, the first device reports the N band combination lists different from the first capability. When the capability of the first device changes, the third information sent by the first device to the second device indicates a band combination list supported by the adjusted capability of the first device. The band combination list may include a currently working band combination. Alternatively, the first device indicates one or more suspending band combination lists to the second device.

In another possible implementation, in the step S910, the first device reports the N feature set combinations. The N feature set combinations are associated with one band combination by using corresponding feature set combination identifiers. When the capability of the first device changes, the third information sent by the first device to the second device indicates a band combination (which should include a currently working band combination) supported by the adjusted capability of the first device and a corresponding feature set combination identifier, or indicates feature set combination identifier corresponding to a suspending band combination. In this manner, if a capability of the first device at a band combination level changes, it indicates that the capability of the first device is also adjusted to a reduced-capability NR carrier aggregation parameter.

In another possible implementation, in the step S910, the first device reports the N feature sets (per band feature sets). The N feature sets correspond to one band in a band combination. When the capability of the first device changes, the indication information sent by the first device to the second device indicates, in a feature set combination corresponding to a band combination (which should include a currently working band combination) in which the first device currently works, one or more per band feature set identifiers supported by the band or one or more suspending per band feature set identifiers.

In another possible implementation, in the step S910, the first device reports the N feature sets per component carrier (per CC feature sets). The N feature sets per component carrier correspond to one component carrier on one band in a band combination. When the capability of the first device changes, the third information sent by the first device to the second device indicates, in a feature set combination corresponding to a band combination (which should include a currently working band combination) supported by a current capability of the first device, one or more per CC feature set identifiers supported by the band or one or more suspending per CC feature set identifiers.

In this manner in which the third information indicates the capability parameter to which the first device is adjusted or needs to be adjusted, the capability mode may be decoupled from the capability parameter, and the capability parameter supported by the current capability of the first device is directly indicated during capability adjustment. An advantage of this manner is that, when the first device is in a coupled capability mode, for example, in both the dual-SIM concurrent mode and the overheating mode, the capability can be adjusted more flexibly.

Optionally, the method 900 further includes the following steps.

S960: The first device receives response information from the second device, or the first device receives no response information within first duration after sending the third information. The response information indicates that the second device allows the capability of the first device to be adjusted to a capability parameter set corresponding to the capability parameter set identifier or adjusted to a capability parameter corresponding to the capability parameter identifier. Then, the first device communicates with the second device based on the adjusted capability parameter set or the adjusted capability parameter.

In some embodiments, after sending the third information, the UE waits, within the first duration (for example, duration of a timer), for the response message fed back by the second device. Correspondingly, after receiving the third information sent by the UE, the second device sends the response information.

It should be understood that the timer may be configured by the second device or implemented by the UE. After the timer expires, the UE actively performs capability adjustment, and communicates with the second device based on the adjusted capability parameter set.

S970: The second device changes a configuration of the first device based on the third information.

Optionally, an RRC configuration is changed. For example, the second device sends an RRC reconfiguration message to the first device. The RRC reconfiguration message is used to reconfigure the first device based on the adjusted capability parameter of the first device. A change of an RRC connection configuration includes radio bearer establishment, modification, and release, synchronization reconfiguration, measurement reconfiguration, cell and cell group reconfiguration, handover reconfiguration, and the like.

Figure 10:
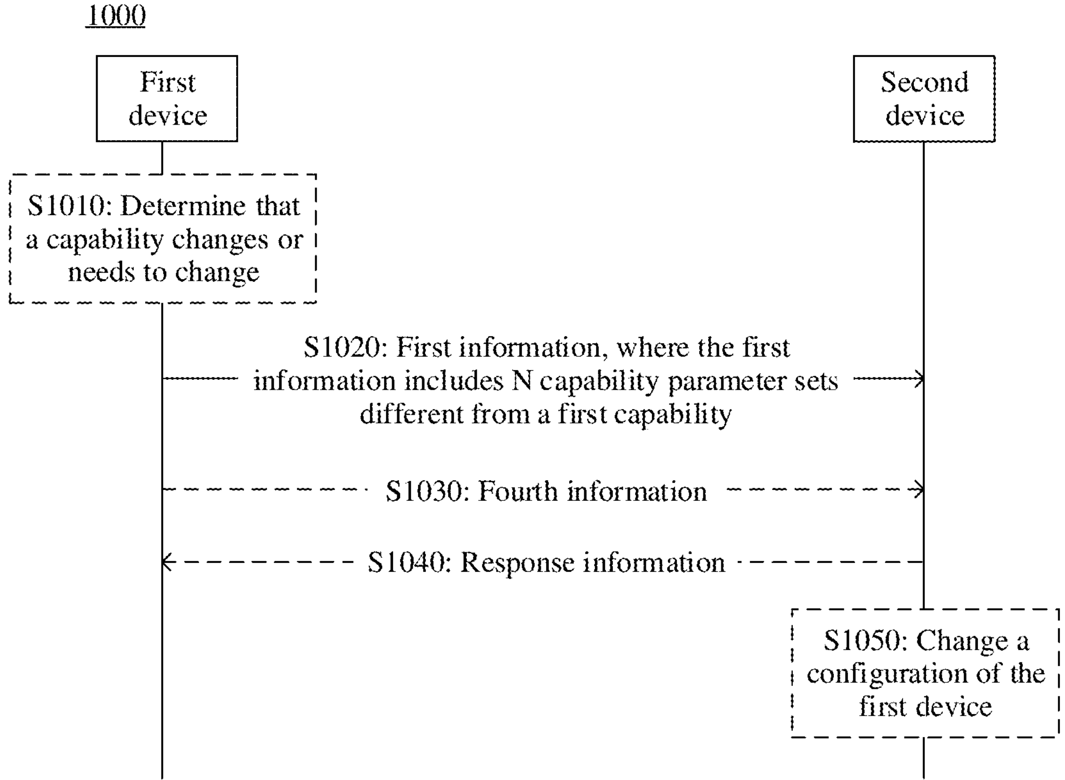
FIG. 10 is a schematic flowchart of another communication method applicable to an embodiment of this application.

FIG. 10 is a schematic flowchart of another communication method according to an embodiment of this application. The method 1000 includes the following steps.

S1010. A first device determines that a capability changes, or determines that a capability of the first device needs to change, for example, when the first device enters a dual-SIM concurrent mode, or enters an internet of vehicles service, to occupy some baseband resources or RF resources, overheating/supercooling occurs, the first device is used to save power, in-device coexistence interference occurs, a device is adjusted to a reduced-capability device, or a service is adjusted to a low-latency and high-reliability service.

S1020: The first device sends first information to a second device. The first information includes N capability parameter sets different from a first capability. The capability parameter set is a capability parameter set supported by the first device when the first device request capability adjustment from the second device. The first capability is a maximum capability supported by the first device. N is equal to 1.

It should be understood that when it is determined that the capability of the first device changes or needs to change, the first device reports, to the second device based on the first message, a capability parameter set to which the first device is adjusted or needs to be adjusted.

Optionally, the capability parameter set may include an RF parameter to which the first device is adjusted or needs to be adjusted. The RF parameter includes at least one of the following parameters: a band combination, a feature set combination, a feature set combination of a band, and a feature set combination of a carrier.

Optionally, the capability parameter set may further include at least one of the following: a PDCP SN length, an RLC SN length, a number of HARQ processes, a DRX configuration, an offset parameter scheduling and processing capability at a physical layer, a CSI processing capability, a NAICS capability, a reference signal configuration for measurement, a DC capability, a UE CAT, a MIMO capability, a channel sounding reference signal (SRS) sending switching capability, a maximum number of aggregated carriers, a maximum aggregated bandwidth, a number of MIMO layers, a bandwidth, a number of transmit and receive antennas, uplink and downlink modulation orders, a duplex mode, and a transmit power.

Optionally, the method 1000 further includes the following step.

S1030: The first device sends fourth information to the second device. The fourth information indicates a cause or an objective of capability adjustment of the first device. The cause or objective of capability adjustment includes at least one of the following: hardware capability sharing, overheating, supercooling, power saving, interference, UE category adjustment, and a service type change.

It should be understood that the fourth information and the first information may be same information, the fourth information and the first information may be carried in a same message, the fourth information and the first information may be different information, or the fourth information and the first information are carried in different messages. This is not particularly limited in this application.

Optionally, the method 1000 further includes the following step.

S1040: The first device receives response information from the second device, or the first device receives no response information within first duration after sending the first information. The response information indicates that the second device allows the capability of the first device to be adjusted to a capability parameter corresponding to the capability parameter set. Then, the first device communicates with the second device based on the adjusted capability parameter set.

In some embodiments, after sending the first information, UE waits, within the first duration (for example, duration of a timer), for the response message fed back by the second device. Correspondingly, after receiving the first information sent by the UE, the second device sends the response information.

It should be understood that the timer may be configured by the second device or implemented by the UE. After the timer expires, the UE actively performs capability adjustment, and communicates with the second device based on the adjusted capability parameter set.

S1050: The second device changes a configuration of the first device based on the first information.

Optionally, an RRC configuration is changed. For example, the second device sends an RRC reconfiguration message to the first device. The RRC reconfiguration message is used to reconfigure the first device based on the adjusted capability parameter of the first device. A change of an RRC connection configuration includes radio bearer establishment, modification, and release, synchronization reconfiguration, measurement reconfiguration, cell and cell group reconfiguration, handover reconfiguration, and the like.

In the method 900, the first device reports the N capability parameter sets to the second device before the capability changes or the capability needs to change, so that the second device can predict a capability to which the first device may be adjusted. Compared with the method 1000 in which the first device reports the capability parameter set after the capability changes or the capability needs to change, the method 900 can reduce scheduling complexity of the second device.

It should be noted that an execution body illustrated in the foregoing method provided in this application is merely an example, and the execution body may alternatively be a chip, a chip system, or a processor that supports the execution body in implementing the foregoing method. This is not limited in this application.

The foregoing describes the method embodiments in embodiments of this application with reference to the accompanying drawings. The following describes apparatus embodiments in embodiments of this application. It may be understood that descriptions of the method embodiments may correspond to descriptions of the apparatus embodiments. Therefore, for a part that is not described, refer to the foregoing method embodiments.

It may be understood that, in the foregoing method embodiments, the methods and the operations implemented by the terminal device may alternatively be implemented by a component (for example, a chip or a circuit) used in the terminal device, and the methods and the operations implemented by the network device or forwarding device may alternatively be implemented by a component (for example, a chip or a circuit) used in the network device or forwarding device.

The foregoing describes the method embodiments provided in this application. The following describes the apparatus embodiments provided in this application. It may be understood that descriptions of the apparatus embodiments correspond to descriptions of the method embodiments. Therefore, for content that is not described in detail, refer to the foregoing method embodiments. For brevity, details are not described herein again.

The foregoing mainly describes the solutions provided in embodiments of this application from a perspective of interaction between network elements. It may be understood that, to implement the foregoing functions, each network element such as a transmit end device or a receive end device includes a corresponding hardware structure and/or software module for performing each function. A person skilled in the art may be aware that, with reference to the examples described in embodiments disclosed in this specification, units and algorithm steps can be implemented by hardware or a combination of computer software and hardware in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into functional modules may be performed on a transmit end device or a receive end device based on the foregoing method examples. For example, each functional module may be obtained through division corresponding to each function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used. The following provides descriptions by using an example in which each functional module is obtained through division based on each corresponding function.

Figure 11:
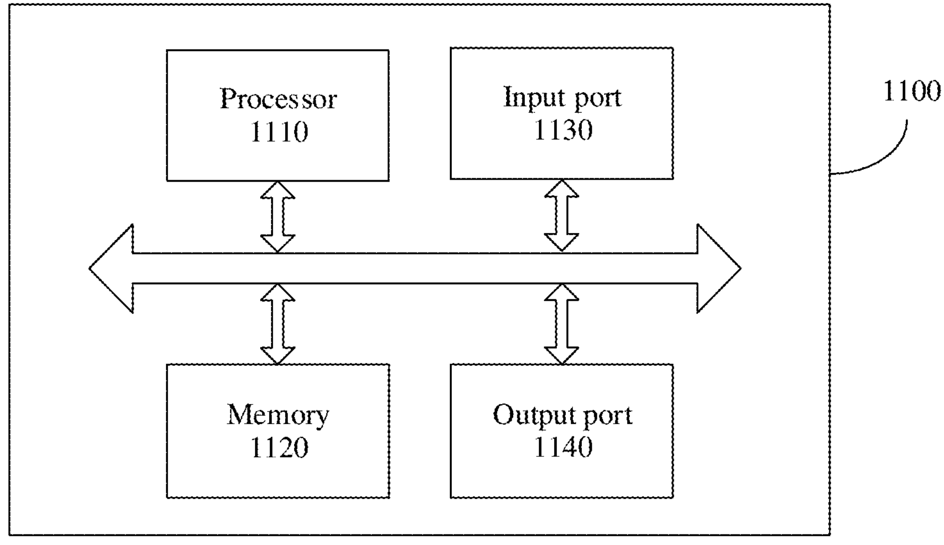
FIG. 11 is a schematic diagram of a first device applicable to an embodiment of this application.

According to the foregoing method, FIG. 11 is a schematic diagram of a first device according to an embodiment of this application.

The first device 1100 may be a terminal device, or may be a chip or a circuit, for example, a chip or a circuit that may be disposed in a terminal device.

The apparatus 1100 may include a processing unit 1110 (that is, an example of a processing unit) and a storage unit 1120. The storage unit 1120 is configured to store instructions.

The processing unit 1110 is configured to execute the instructions stored in the storage unit 1120, so that the apparatus 1100 implements steps performed by the terminal device in the foregoing method.

Further, the apparatus 1100 may further include a transceiver unit. The transceiver unit includes an input port 1130 (that is, an example of a communication unit) and an output port 1140 (that is, another example of the communication unit). Further, the processing unit 1110, the storage unit 1120, the input port 1130, and the output port 1140 may communicate with each other through an internal connection path. The storage unit 1120 is configured to store a computer program. The processing unit 1110 may be configured to: invoke the computer program from the storage unit 1120 and run the computer program, to control the input port 1130 to receive a signal, and control the output port 1140 to send a signal, to complete steps performed by the terminal device in the foregoing method. The storage unit 1120 may be integrated into the processing unit 1110, or may be disposed separately from the processing unit 1110.

Optionally, if the apparatus 1100 is a communication device (for example, the terminal device), the input port 1130 is a receiver, and the output port 1140 is a transmitter. The receiver and the transmitter may be a same physical entity or different physical entities. When the receiver and the transmitter are a same physical entity, the receiver and the transmitter may be collectively referred to as a transceiver.

Optionally, if the apparatus 1100 is a chip or a circuit, the input port 1130 is an input interface, and the output port 1140 is an output interface.

In an implementation, it may be considered that functions of the input port 1130 and the output port 1140 are implemented by using a transceiver circuit or a dedicated transceiver chip. It may be considered that the processing unit 1110 is implemented by using a dedicated processing chip, a processing circuit, a processing unit, or a general-purpose chip.

In another implementation, it may be considered that the communication device (for example, the terminal device) provided in this embodiment of this application is implemented by using a general-purpose computer. In some embodiments, program code for implementing functions of the processing unit 1110, the input port 1130, and the output port 1140 is stored in the storage unit 1120. A general-purpose processing unit executes the code in the storage unit 1120 to implement the functions of the processing unit 1110, the input port 1130, and the output port 1140.

In an implementation, the output port 1140 is configured to send first information to the second device. The first information includes N capability parameter sets different from a first capability. The capability parameter set is a capability parameter set supported by the first device when the first device request capability adjustment from the second device. The first capability is a maximum capability supported by the first device. N is an integer greater than or equal to 1.

Optionally, the N capability parameter sets include at least one of the following parameters: N band combination lists, where the band combination list includes at least one band combination; N feature set combinations, where the N feature set combinations are associated with one band combination by using corresponding feature set combination identifiers; N feature sets, where the N feature sets correspond to one band in a band combination; and N feature sets per component carrier, where the N feature sets per component carrier correspond to one component carrier on one band in a band combination.

Optionally, the N capability parameter sets further include at least one of the following parameters: at least one packet data convergence protocol PDCP sequence number length, at least one radio link control RLC sequence number length, and at least one number of hybrid automatic repeat request HARQ processes.

Optionally, the first information is UE capability information.

Optionally, when the capability parameter sets include a fallback capability parameter supported by the first capability, it may implicitly indicate that the first device supports the fallback capability parameter of the first capability.

Optionally, when both the N capability parameter sets and the maximum capability of the first device are reported, the output port 1140 is further configured to send second information to the second device. The second information explicitly indicates that the first device supports a fallback capability of the first capability.

Optionally, the output port 1140 does not report the N capability parameter sets when reporting the maximum capability. In this solution, the processing unit 1110 determines that a capability of the first device changes or a capability of the first device needs to change, and controls the output port 1140 to send the first information.

Optionally, the output port 1140 reports both the N capability parameter sets and the maximum capability of the first device in the UE capability information; and then the processing unit 1110 determines that a capability of the first device changes or a capability of the first device needs to change, and controls the output port 1140 to send third information to the second device. The third information indicates a capability parameter set identifier or capability parameter identifier to which the first device is adjusted or needs to be adjusted. The capability parameter set identifier is an identifier of one of the N capability parameter sets different from the first capability. The capability parameter identifier is an identifier of a capability parameter in the N capability parameter sets different from the first capability.

Optionally, when the third information indicates the capability parameter identifier to which the first device is adjusted or needs to be adjusted, the third information includes at least one of the following: a band combination list identifier, a band combination, a feature set combination identifier corresponding to the band combination, a per band feature set identifier corresponding to a band in the band combination, and a per component carrier feature set identifier corresponding to a component carrier on the band in the band combination.

Optionally, the input port 1130 is configured to receive response information from the second device, or the output port 1140 receives no response information within first duration after sending the third information. The response information indicates that the second device allows the capability of the first device to be adjusted to a capability parameter set corresponding to the capability parameter set identifier or adjusted to a capability parameter corresponding to the capability parameter identifier. The first device communicates with the second device based on the adjusted capability parameter set or the adjusted capability parameter.

Functions and actions of the modules or units in the first device 1100 enumerated above are merely examples for description. When the apparatus 1100 is disposed in or is the terminal device, the modules or units in the apparatus 1100 may be configured to perform the actions or processing processes performed by the first device in the foregoing method. Herein, to avoid repetition, detailed descriptions thereof are omitted.

For concepts, explanations, detailed description, and other steps of the apparatus 1100 that are related to the technical solutions provided in embodiments of this application, refer to descriptions of the content in the foregoing method or other embodiments. Details are not described herein again.

Figure 12:
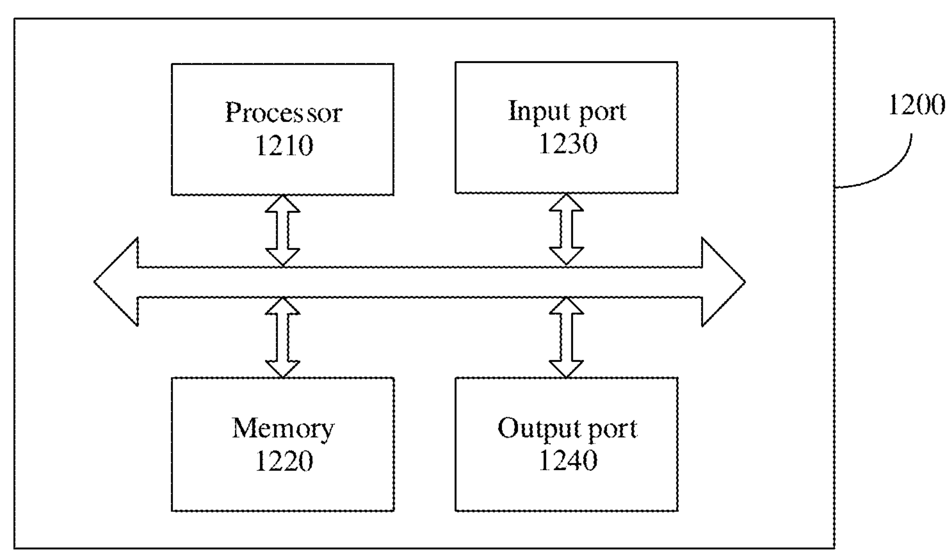
FIG. 12 is a schematic diagram of a second device applicable to an embodiment of this application.

According to the foregoing method, FIG. 12 is a schematic diagram of a second device according to an embodiment of this application.

The apparatus 1200 may be a network device or a terminal device, or may be a chip or a circuit, for example, a chip or a circuit that may be disposed in a network device or a terminal device.

The apparatus 1200 may include a processing unit 1210 (that is, an example of a processing unit) and a storage unit 1220. The storage unit 1220 is configured to store instructions.

The processing unit 1210 is configured to execute the instructions stored in the storage unit 1220, so that the apparatus 1200 implements steps performed by an access device in the foregoing method.

Further, the apparatus 1200 may further include a transceiver unit. The transceiver unit includes an input port 1230 (that is, an example of a communication unit) and an output port 1240 (that is, another example of the communication unit). Further, the processing unit 1210, the storage unit 1220, the input port 1230, and the output port 1240 may communicate with each other through an internal connection path, to transmit a control signal and/or a data signal. The storage unit 1220 is configured to store a computer program. The processing unit 1210 may be configured to: invoke the computer program from the storage unit 1220 and run the computer program, to control the input port 1230 to receive a signal, and control the output port 1240 to send a signal, to complete steps performed by the terminal device in the foregoing method. The storage unit 1220 may be integrated into the processing unit 1210, or may be disposed separately from the processing unit 1210.

Optionally, if the apparatus 1200 is a communication device (for example, a network device or a terminal device), the input port 1230 is a receiver, and the output port 1240 is a transmitter. The receiver and the transmitter may be a same physical entity or different physical entities. When the receiver and the transmitter are a same physical entity, the receiver and the transmitter may be collectively referred to as a transceiver.

Optionally, if the apparatus 1200 is a chip or a circuit, the input port 1230 is an input interface, and the output port 1240 is an output interface.

In an implementation, it may be considered that functions of the input port 1230 and the output port 1240 are implemented by using a transceiver circuit or a dedicated transceiver chip. It may be considered that the processing unit 1210 is implemented by using a dedicated processing chip, a processing circuit, a processing unit, or a general-purpose chip.

In another implementation, it may be considered that the communication device (for example, the network device or the terminal device) provided in this embodiment of this application is implemented by using a general-purpose computer. In some embodiments, program code for implementing functions of the processing unit 1210, the input port 1230, and the output port 1240 is stored in the storage unit 1220. A general-purpose processing unit executes the code in the storage unit 1220 to implement the functions of the processing unit 1210, the input port 1230, and the output port 1240.

In an implementation, the input port 1230 is configured to receive first information from a first device. The first information includes N capability parameter sets different from a first capability. The capability parameter set is a capability parameter set supported by the first device when the first device request capability adjustment from the second device. The first capability is a maximum capability supported by the first device. N is an integer greater than or equal to 1.

Optionally, the N capability parameter sets include at least one of the following parameters: N band combination lists, where the band combination list includes at least one band combination; N feature set combinations, where the N feature set combinations are associated with one band combination by using corresponding feature set combination identifiers; N feature sets, where the N feature sets correspond to one band in a band combination; and N feature sets per component carrier, where the N feature sets per component carrier correspond to one component carrier on one band in a band combination.

Optionally, the capability parameter sets further include at least one of the following parameters: at least one PDCP sequence number length, at least one RLC sequence number length, and at least one number of HARQ processes.

Optionally, the first information is UE capability information.

Optionally, when the capability parameter sets include a fallback capability parameter supported by the first capability, it implicitly indicates that the first device supports the fallback capability parameter of the first capability.

Optionally, the input port 1230 is further configured to receive second information from the first device. The second information indicates that the first device supports a fallback capability of the first capability.

Optionally, after the input port 1230 receives the first information, the processing unit 1210 changes a configuration of the first device based on the N capability parameter sets different from the first capability.

Optionally, the input port 1230 is further configured to receive third information from the first device. The third information indicates a capability parameter set identifier or capability parameter identifier to which the first device is adjusted or needs to be adjusted. The capability parameter set identifier is an identifier of one of the N capability parameter sets different from the first capability. The capability parameter identifier is an identifier of a capability parameter in the N capability parameter sets different from the first capability. The processing unit 1210 is further configured to change a configuration of the first device based on the third information.

Optionally, the input port 1230 is further configured to receive fourth information from the first device. The fourth information indicates a cause or an objective of capability adjustment of the first device.

Optionally, when the third information indicates the capability parameter identifier to which the first device is adjusted or needs to be adjusted, the third information includes at least one of the following: a band combination list identifier, a band combination, a feature set combination identifier corresponding to the band combination, a per band feature set identifier corresponding to a band in the band combination, and a per component carrier feature set identifier corresponding to a component carrier on the band in the band combination.

Optionally, the output port 1240 is configured to send response information. The response information indicates that the second device allows a capability of the first device to be adjusted to a capability parameter set corresponding to the capability parameter set identifier or adjusted to a capability parameter corresponding to the capability parameter identifier. Then the second device communicates with the first device whose capability parameter set or capability parameter is adjusted.

Figure 13:
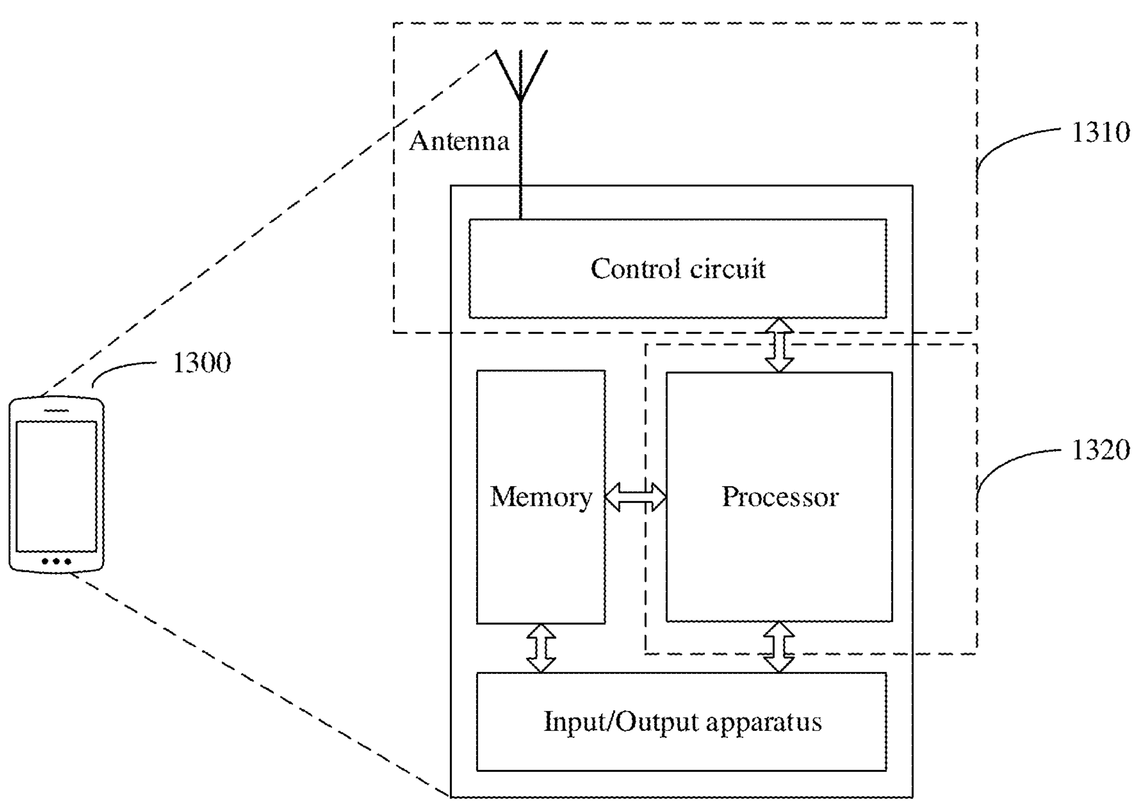
FIG. 13 is a schematic diagram of a structure of a first device applicable to an embodiment of this application.

FIG. 13 is a schematic diagram of a structure of a first device according to an embodiment of this application. The apparatus 1100 may be disposed in the terminal device 1300, or the apparatus 1100 may be the terminal device 1300. In other words, the terminal device 1300 may perform an action performed by the first device in the method 900 or the method 1000.

For ease of description, FIG. 13 shows only main components of the terminal device. As shown in FIG. 13, the apparatus 1300 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing the actions described in the foregoing embodiments of the indication method for transmitting a precoding matrix. The memory is mainly configured to store the software program and the data, for example, store a codebook described in the foregoing embodiments. The control circuit is mainly configured to: convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to: receive data input by a user and output data to the user.

After the terminal device is powered on, the processor may read a software program in a storage unit, explain and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends a radio frequency signal in an electromagnetic wave form through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 13 shows only one memory and one processor. In an actual terminal device, there may be a plurality of processors and memories. The memory may also be referred to as a storage medium, a storage device, or the like. This is not limited in this embodiment of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 13 integrates functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

For example, in this embodiment of this application, the antenna and the control circuit that have a transceiver function may be considered as a transceiver unit 1310 of the terminal device 1300, and the processor having a processing function may be considered as a processing unit 1320 of the terminal device 1300. As shown in FIG. 13, the terminal device 1300 includes the transceiver unit 1310 and the processing unit 1320. The transceiver unit may also be referred to as a transceiver, a transceiver machine, a transceiver apparatus, or the like. Optionally, a component that is in the transceiver unit 1310 and that is configured to implement a receiving function may be considered as a receiving unit, and a component that is in the transceiver unit 1310 and that is configured to implement a sending function may be considered as a sending unit. That is, the transceiver unit includes the receiving unit and the sending unit. For example, the receiving unit may also be referred to as a receiver machine, a receiver, or a receiver circuit, and the sending unit may also be referred to as a transmitter machine, a transmitter, or a transmitter circuit.

Figure 14:
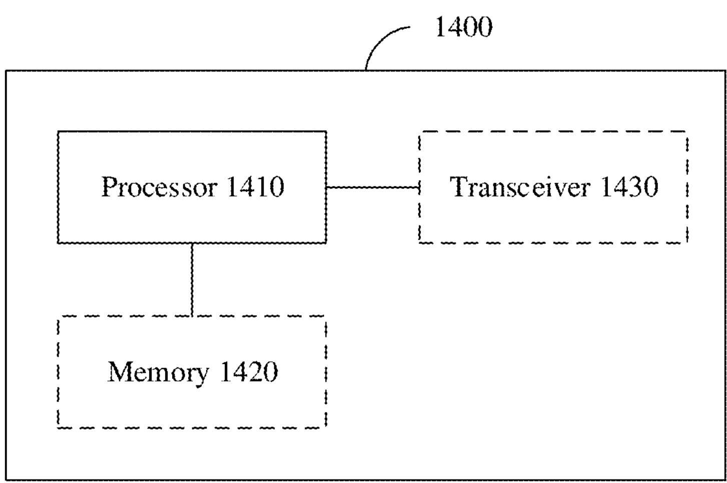
FIG. 14 is a schematic diagram of a structure of a second device applicable to an embodiment of this application.

FIG. 14 is a schematic diagram of a structure of a second device according to an embodiment of this application.

As shown in FIG. 14, an embodiment of this application further provides a communication apparatus 1400. The communication apparatus 1400 may be a terminal device or a network device. The apparatus 1200 may be disposed in the communication apparatus 1400, or the apparatus 1200 may be the communication apparatus 1400. In other words, the communication apparatus 1400 may perform an action performed by the second device in the method 900 or the method 1000.

The communication apparatus 1400 includes a processor 1410. The processor 1410 is coupled to a memory 1420. The memory 1420 is configured to store a computer program or instructions and/or data. The processor 1410 is configured to execute the computer program or the instructions and/or the data stored in the memory 1420, to perform the method in the foregoing method embodiment.

Optionally, the communication apparatus 1400 includes one or more processors 1410.

Optionally, as shown in FIG. 14, the communication apparatus 1400 may further include the memory 1420.

Optionally, the communication apparatus 1400 includes one or more memories 1420.

Optionally, the memory 1420 and the processor 1410 may be integrated together, or separately disposed.

Optionally, as shown in FIG. 14, the communication apparatus 1400 may further include a transceiver 1430. The transceiver 1430 is configured to receive and/or send a signal. For example, the processor 1410 is configured to control the transceiver 1430 to receive and/or send a signal.

In another solution, the communication apparatus 1400 is configured to perform operations performed by the second device in the foregoing method embodiment. For example, the processor 1410 is configured to implement operations performed internally by the second device in the foregoing method embodiment, and the transceiver 1430 is configured to implement a receiving or sending operation performed by the second device in the foregoing method embodiment. A processing unit in the apparatus 1200 may be the processor in FIG. 14, and an input/output port may be the transceiver in FIG. 14. For specific operations performed by the processor 1410, refer to the foregoing description of the processing unit. For operations performed by the transceiver 1430, refer to the description of the input/output port. Details are not described herein again.

An embodiment of this application further provides a computer-readable storage medium. The computer-readable storage medium stores computer instructions used to implement the methods performed by the terminal device or the network device in the foregoing method embodiments.

For example, when the computer program is executed by a computer, the computer is enabled to implement the methods performed by the terminal device or the network device in the foregoing method embodiments.

An embodiment of this application further provides a computer program product including instructions. When the instructions are executed by a computer, the computer is enabled to implement the methods performed by the terminal device or the network device in the foregoing method embodiments.

For explanations and beneficial effect of related content of any one of the apparatuses provided above, refer to the corresponding method embodiment provided above. Details are not described herein again.

It should be understood that the processor in embodiments of this application may be a central processing unit (CPU), another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM).

For example, the RAM may be used as an external cache. As an example instead of a limitation, the RAM may include the following plurality of forms: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or transistor logic device, or a discrete hardware component, the memory (storage module) may be integrated into the processor.

It should further be noted that the memory described in this specification is intended to include but is not limited to these memories and any memory of another proper type.

The terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in the figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the internet interacting with another system by using the signal).

A person of ordinary skill in the art may be aware that, with reference to the examples described in embodiments disclosed in this specification, units and algorithm steps can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

It may be clearly understood by a person skilled in the art that, for ease and brevity of description, for a detailed working process of foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located at one location, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit.

All or some of the foregoing embodiments may be implemented by software, hardware, firmware, or any combination thereof. When the software is used for implementation, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. For example, the computer may be a personal computer, a server, a network device, or the like. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. For example, the usable medium may include but is not limited to any medium that can store program code, such as a USB flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims and this specification.

What is claimed is:

1. A communication method, comprising:

sending, by a first device, first information to a second device, wherein the second device is a network device or a terminal device, the first information is sent before a capability of the first device changes or before the capability of the first device needs to change, the first information comprises N capability parameter sets different from a first capability, the N capability parameter sets are supported by the first device at a time when the first device requests capability adjustment from the second device, the first capability is a maximum capability supported by the first device, and N is an integer greater than or equal to 1; and after determining that the capability of the first device changes or determining that the capability of the first device needs to change, sending, by the first device, third information to the second device, wherein the third information indicates a capability parameter set identifier or a capability parameter identifier to which the first device is adjusted or needs to be adjusted, the capability parameter set identifier is an identifier of one of the N capability parameter sets, and the capability parameter identifier is an identifier of a capability parameter in the N capability parameter sets.

2. The communication method according to claim 1, wherein the N capability parameter sets comprise at least one of:

N band combination lists, wherein the N band combination lists comprise at least one band combination;

N feature set combinations, wherein the N feature set combinations are associated with one band combination by using corresponding feature set combination identifiers;

N feature sets, wherein the N feature sets correspond to one band in a band combination; or N feature sets per component carrier, wherein the N feature sets per component carrier correspond to one component carrier on one band in the band combination.

3. The communication method according to claim 2, wherein the capability parameter sets further comprise at least one of:

at least one packet data convergence protocol (PDCP) sequence number length;

at least one radio link control (RLC) sequence number length; or at least one number of hybrid automatic repeat request (HARQ) processes.

4. The communication method according to claim 1, wherein the first information is user equipment (UE) capability information.

5. The communication method according to claim 1, wherein the capability parameter sets comprise a fallback capability parameter supported by the first capability, and the first device supports the fallback capability parameter of the first capability.

6. The communication method according to claim 1, further comprising:

sending, by the first device, second information to the second device, wherein the second information indicates that the first device supports a fallback capability of the first capability.

7. The communication method according to claim 1, further comprising:

determining the capability of the first device changes; or determining the capability of the first device needs to change.

8. The communication method according to claim 1, wherein the third information is sent in response to determining the capability of the first device changes or in response to determining the capability of the first device needs to change.

9. The communication method according to claim 1, further comprising:

sending, by the first device, fourth information to the second device, wherein the fourth information indicates a cause or an objective of the capability adjustment.

10. A communication method, comprising:

receiving, by a second device, first information from a first device, wherein the second device is a network device or a terminal device, the first information is received before a capability of the first device changes or before the capability of the first device needs to change, the first information comprises N capability parameter sets different from a first capability, the N capability parameter sets are supported by the first device at a time when the first device requests capability adjustment from the second device, the first capability is a maximum capability supported by the first device, and N is an integer greater than or equal to 1; and receiving, by the second device, third information from the first device after the capability of the first device changes or after the capability of the first device needs to change, wherein the third information indicates a capability parameter set identifier or a capability parameter identifier to which the first device is adjusted or needs to be adjusted, the capability parameter set identifier is an identifier of one of the N capability parameter sets, and the capability parameter identifier is an identifier of a capability parameter in the N capability parameter sets.

11. The communication method according to claim 10, wherein the N capability parameter sets comprise at least one of:

N band combination lists, wherein the N band combination lists comprise at least one band combination;

N feature set combinations, wherein the N feature set combinations are associated with one band combination by using corresponding feature set combination identifiers;

N feature sets, wherein the N feature sets correspond to one band in a band combination; or N feature sets per component carrier, wherein the N feature sets per component carrier correspond to one component carrier on one band in the band combination.

12. The communication method according to claim 11, wherein the capability parameter sets further comprise at least one of:

at least one packet data convergence protocol (PDCP) sequence number length;

at least one radio link control (RLC) sequence number length; or at least one number of hybrid automatic repeat request (HARQ) processes.

13. The communication method according to claim 10, wherein the first information is user equipment (UE) capability information.

14. The communication method according to claim 10, wherein the capability parameter sets comprise a fallback capability parameter supported by the first capability, and the first device supports the fallback capability parameter of the first capability.

15. The communication method according to claim 10, further comprising:

receiving, by the second device, second information from the first device, wherein the second information indicates that the first device supports a fallback capability of the first capability.

16. The communication method according to claim 10, further comprising:

changing a configuration of the first device based on the N capability parameter sets different from the first capability.

17. The communication method according to claim 10, further comprising:

changing a configuration of the first device based on the third information.

18. An apparatus, comprising:

a processor; and a memory having instructions stored thereon that, when executed by the processor, cause the apparatus to:

cause a first device to send first information to a second device, wherein the second device is a network device or a terminal device, the first information is sent before a capability of the first device changes or before the capability of the first device needs to change, the first information comprises N capability parameter sets different from a first capability, the N capability parameter sets are supported by the first device at a time when the first device requests capability adjustment from the second device, the first capability is a maximum capability supported by the first device, and N is an integer greater than or equal to 1; and after determining that the capability of the first device changes or determining that the capability of the first device needs to change, sending, by the first device, third information to the second device, wherein the third information indicates a capability parameter set identifier or a capability parameter identifier to which the first device is adjusted or needs to be adjusted, the capability parameter set identifier is an identifier of one of the N capability parameter sets, and the capability parameter identifier is an identifier of a capability parameter in the N capability parameter sets.

19. The apparatus according to claim 18, wherein the N capability parameter sets comprise at least one of:

N band combination lists, wherein the N band combination lists comprise at least one band combination;

N feature set combinations, wherein the N feature set combinations are associated with one band combination by using corresponding feature set combination identifiers;

N feature sets, wherein the N feature sets correspond to one band in a band combination; or N feature sets per component carrier, wherein the N feature sets per component carrier correspond to one component carrier on one band in the band combination.

20. The apparatus according to claim 19, wherein the capability parameter sets further comprise at least one of:

at least one packet data convergence protocol (PDCP) sequence number length;

at least one radio link control (RLC) sequence number length; or at least one number of hybrid automatic repeat request (HARQ) processes.

* * * * *